(12) United States Patent
Shimmitsu

(10) Patent No.: US 8,990,588 B2
(45) Date of Patent: Mar. 24, 2015

(54) STORAGE SYSTEM, STORAGE CONTROL APPARATUS, AND STORAGE CONTROL METHOD

(75) Inventor: Masaru Shimmitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 272 days.

(21) Appl. No.: 13/603,487

(22) Filed: Sep. 5, 2012

(65) Prior Publication Data

US 2013/0086394 A1    Apr. 4, 2013

(30) Foreign Application Priority Data

Sep. 30, 2011 (JP) ................................ 2011-215953

(51) Int. Cl.
*G06F 15/16* (2006.01)
*G06F 3/06* (2006.01)
*G06F 21/78* (2013.01)

(52) U.S. Cl.
CPC .............. *G06F 3/0652* (2013.01); *G06F 21/78* (2013.01); *G06F 3/061* (2013.01); *G06F 3/0623* (2013.01); *G06F 3/0689* (2013.01); *G06F 2221/2143* (2013.01)
USPC ........... 713/193; 713/164; 713/165; 713/184; 713/185; 380/44; 380/239; 380/277; 711/169; 711/170

(58) Field of Classification Search
USPC ........................... 713/188, 193; 711/169, 170
See application file for complete search history.

(56) References Cited

U.S. PATENT DOCUMENTS

| 7,395,425 | B2 * | 7/2008 | Nakano et al. ................. 713/163 |
| 8,745,747 | B2 * | 6/2014 | Song et al. ...................... 726/26 |
| 2008/0101605 | A1 | 5/2008 | Kitamura et al. |
| 2009/0177895 | A1 | 7/2009 | Murayama et al. |
| 2009/0196417 | A1 * | 8/2009 | Beaver et al. ................... 380/45 |
| 2010/0115223 | A1 | 5/2010 | Sakaguchi |
| 2012/0260023 | A1 * | 10/2012 | Nagai et al. .................... 711/103 |

FOREIGN PATENT DOCUMENTS

| JP | 2008-108039 | 5/2008 |
| JP | 2009-163542 | 7/2009 |
| JP | 2009-225437 | 10/2009 |
| JP | 2010-113509 | 5/2010 |

OTHER PUBLICATIONS

"Database Driven Cache Invalidation"—Magnus Hagander, DrakeCon, Oct. 2010 http://www.hagander.net/talks/Database%20driven%20cache%20invalidation.pdf.*

* cited by examiner

*Primary Examiner* — Randy Scott
(74) *Attorney, Agent, or Firm* — Fujitsu Patent Center

(57) ABSTRACT

A storage system in which a storage control apparatus writes data in each of divided areas defined by division of one or more storage areas in one or more storage devices, after encryption of the data with an encryption key unique to each divided area. When the storage control apparatus receives, from a management apparatus, designation of one or more of the divided areas allocated as one or more physical storage areas for a virtual storage area to be invalidated and an instruction to invalidate data stored in the one or more of the divided areas, the storage control apparatus invalidates one or more encryption keys associated with the designated one or more of the divided areas. In addition, the storage control apparatus may further overwrite at least part of the designated one or more of the divided areas with initialization data for data erasion.

20 Claims, 25 Drawing Sheets

340 ENCRYPTION-KEY MANAGEMENT TABLE

| RAID Group | LUN#1 | LUN#2 | LUN#3 | LUN#4 |
|---|---|---|---|---|
| RG#01 | ABxx01 | ABxx02 | ABxx03 | ABxx04 |
| RG#02 | CDxx01 | CDxx02 | CDxx03 | CDxx04 |
| RG#03 | EFxx01 | EFxx02 | EFxx03 | EFxx04 |
| ⋮ | ⋮ | ⋮ | ⋮ | ⋮ |

FIG. 8

350 DATA-ERASION MANAGEMENT TABLE

| Virtual Machine | Virtual Disk | RAID Group | Logical Unit | Areas Subject To Erasion | | | | |
|---|---|---|---|---|---|---|---|---|
| VM#01 | VD#01 | RG#01 | LUN#1 | 0x00000010 Overwritten | 0x00000011 Overwritten | 0x00000012 Overwritten | ...... | 0x0000001x Overwritten |
| | | RG#02 | LUN#1 | 0x00000010 Overwritten | 0x00000011 Unprocessed | 0x00000012 Overwritten | ...... | 0x0000001x Unprocessed |
| | | RG#03 | LUN#1 | 0x00000010 Unprocessed | 0x00000011 Unprocessed | 0x00000012 Unprocessed | ...... | 0x0000001x Unprocessed |

FIG. 10

STORAGE-POOL MANAGEMENT TABLE 440

| LV number | Status |
|---|---|
| LV#11 | Currently Used |
| LV#12 | Currently Used |
| LV#13 | Being Initializied |
| LV#14 | Unused |
| LV#21 | Currently Used |
| LV#22 | Currently Used |
| LV#23 | Being Initializied |
| LV#24 | Unused |
| LV#31 | Currently Used |
| LV#32 | Being Initialzied |
| LV#33 | Being Initializied |
| LV#34 | Unused |
| ⋮ | ⋮ |

FIG. 11

450 VIRTUAL-DISK MANAGEMENT TABLE

| Virtual Server | Virtual Disk | Data-erasion Mode | Constituent LUN | | | |
|---|---|---|---|---|---|---|
| VM#01 | VD#01 | Third Data-erasion Mode (with Overwriting) | LV#11 | LV#21 | LV#31 | |
| VM#02 | VD#02 | Second Data-erasion Mode (without Overwriting) | LV#12 | LV#22 | | |
| VM#03 | VD#03 | First Data-erasion Mode (with Overwriting) | LV#32 | LV#13 | LV#23 | LV#33 |

FIG. 13A

SERVICE CORRESPONDENCE TABLE 461
(Including Third Data-erasion Mode with Encryption-key Change)

|  | Service A1 | Service B1 | Service C1 |
|---|---|---|---|
| Performance Attribute | High Speed | Medium Speed | Low Speed |
| Data-erasion Mode | Third Data-erasion Mode | First Data-erasion Mode | Second Data-erasion Mode |
| Usage Fee | High | Medium | Low |

FIG. 13B

SERVICE CORRESPONDENCE TABLE 462
(Including Third Data-erasion Mode without Encryption-key Change)

|  | Service A2 | Service B2 | Service C2 |
|---|---|---|---|
| Performance Attribute | High Speed | Low Speed | Medium Speed |
| Data-erasion Mode | First Data-erasion Mode | Second Data-erasion Mode | Third Data-erasion Mode |
| Usage Fee | High | Medium | Low |

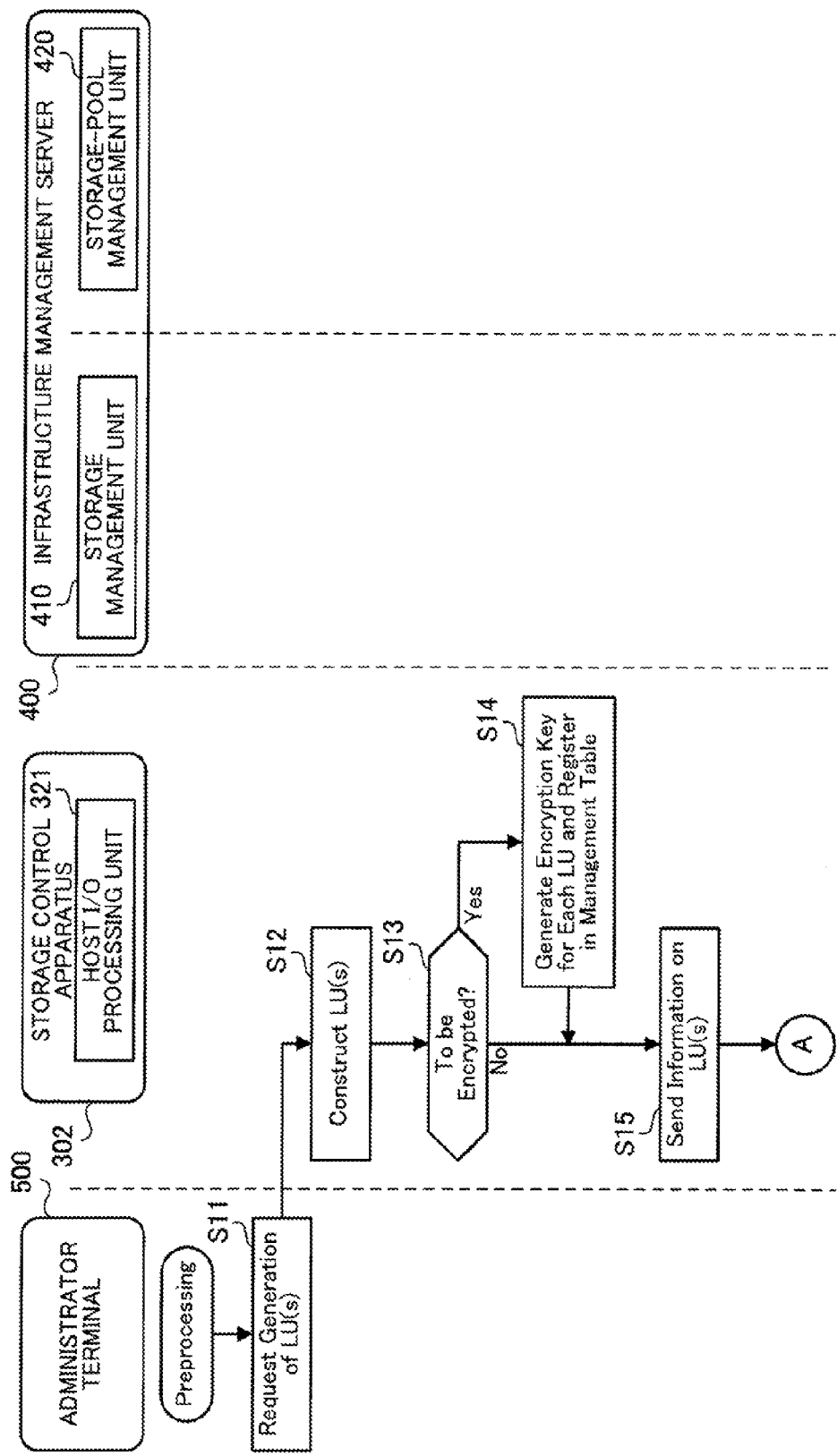

STORAGE SYSTEM, STORAGE CONTROL APPARATUS, AND STORAGE CONTROL METHOD

CROSS-REFERENCE TO RELATED APPLICATION

This application is based on and claims the benefits of priority from the prior Japanese Patent Application No. 2011-215953, filed on Sep. 30, 2011, the contents of which are incorporated herein by reference.

FIELD

The embodiments discussed herein relate to a storage control apparatus, a storage system, and a storage control method.

BACKGROUND

Storage systems in which data are stored in storage devices such as HDDs (hard disk drives) after encryption of the data are known. In such storage systems, reading of the stored data can be made unable by obliterating an encryption key for use in decryption of the stored, encrypted data. Therefore, the stored data can be substantially erased in a short time.

In some storage systems which use a data erasing method based on obliteration of the encryption key, data are encrypted by using an encryption key unique to each logical volume, and the data are erased on the logical-volume basis by obliterating the encryption key. Further, in other storage systems, data are encrypted and stored in virtualized volumes.

On the other hand, in recent years, the server virtualization technology has been receiving attention. In the server virtualization technology, a server computer is divided into multiple virtual computers called virtual machines, and each virtual machine separately executes an OS (operating system) program and one or more application programs. The server virtualization technology enables flexible allocation of the hardware resources in the computer system including processors, memories, and communication lines according to the demands, and efficient use of the hardware resources. In addition, in many cases, disk volumes for virtual machines realized by use of the server virtualization technology are virtually constructed as virtual disks.

See, for example, Japanese Laid-open Patent Publications Nos. 2009-225437, 2008-108039, 2010-113509, and 2009-163542.

Incidentally, there are demands for erasing, in a short time, data stored in a virtual disk constructed for a virtual machine, by obliterating an encryption key before use of the virtual machine is completed. However, in many systems realizing virtual machines, physical storage areas are allocated for virtual disks by an apparatus different from a storage control apparatus which encrypts data to be stored in physical storage areas and manages encryption keys. In the systems in which the physical storage areas are allocated for the virtual disks by an apparatus different from the storage control apparatus, the storage control apparatus encrypts data to be stored in the physical storage areas and manages the encryption keys without awareness of the allocation of the physical storage areas for the virtual disks. Therefore, it is difficult to obliterate the encryption key for each virtual disk.

SUMMARY

According to an aspect, there is provided a storage control apparatus including a memory configured to store encryption-key information and a processor configured to perform a procedure. The encryption-key information stored in the memory includes encryption keys respectively associated with divided areas defined by division of one or more storage areas in one or more storage devices. The procedure performed by the processor includes: operations of acquiring from the encryption-key information one of the encryption keys associated with one of the divided areas in which data is to be written, encrypting the data to be written, by use of the one of the encryption keys, to generate encrypted data, and writing the encrypted data in the one of the divided areas; and an operation of invalidating one or more of the encryption keys associated with one or more of the divided areas and included in the encryption-key information when the storage control apparatus receives, from a management apparatus, designation of the one or more of the divided areas allocated as one or more physical storage areas for a virtual storage area to be invalidated and an instruction to invalidate data stored in the one or more of the divided areas.

The storage control apparatus according to the above aspect can invalidate data stored in a virtual storage area, in a short time.

The objects and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIG. 8 illustrates examples of information items recorded in a data-erasion management table;

FIG. 10 illustrates examples of information items recorded in a storage-pool management table;

FIG. 11 illustrates examples of information items recorded in a virtual-disk management table;

FIGS. 13A and 13B illustrate examples of service correspondence tables, which respectively indicate two different examples of sets of services;

FIGS. 14 and 15 indicate an example of a flow of preprocessing for constructing virtual machines and virtual disks;

DESCRIPTION OF EMBODIMENTS

The embodiments will be explained below with reference to the accompanying drawings, wherein like reference numbers refer to like elements throughout.

1. First Embodiment

Figure 1:
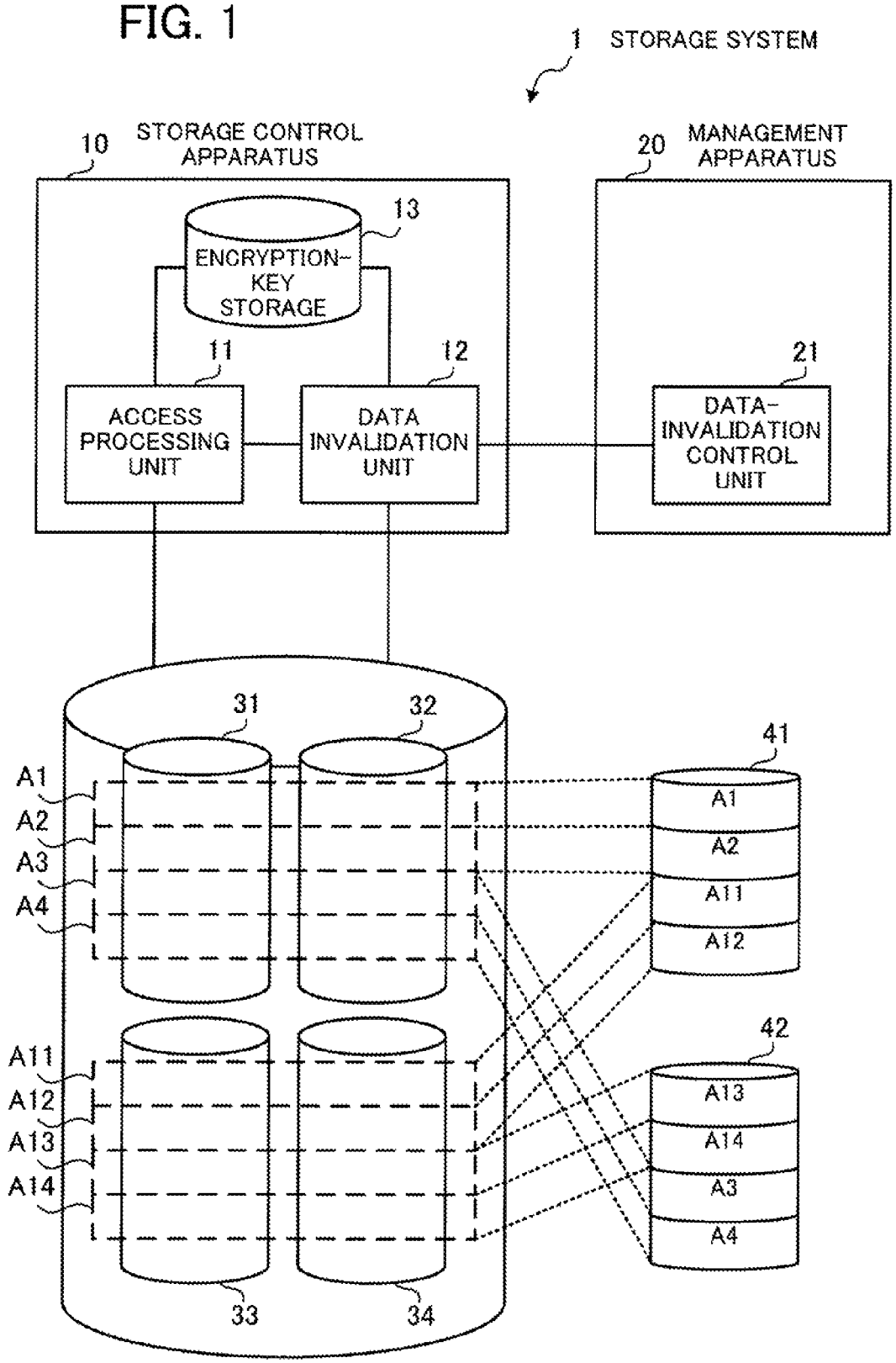
FIG. 1 illustrates an example of a storage system according to a first embodiment.

FIG. 1 illustrates the storage system according to the first embodiment. The storage system 1 contains a storage control apparatus 10 and a management apparatus 20. A plurality of storage devices (storage devices 31 to 34 in the example of FIG. 1) are connected to the storage control apparatus 10. The storage devices 31 to 34 are nonvolatile storage devices such as HDDs, SSDs (solid-state drives), and the like. The storage control apparatus contains an access processing unit 11, a data invalidation unit 12, and an encryption-key storage 13. The functions of the access processing unit 11 and the data invalidation unit 12 are realized when a CPU (central processing unit) contained in the storage control apparatus 10 executes a predetermined program. The encryption-key storage 13 is realized by a nonvolatile storage device such as an HDD.

The physical storage areas in storage devices 31 to 34 are divided into divided areas, and an encryption key is uniquely prepared for each of the divided areas. Before data is stored in each divided area, the access processing unit 11 encrypts the data to be stored in each divided area, with an encryption key unique to the divided area, and writes the encrypted data in the divided area. The encryption-key storage 13 stores the encryption keys respectively in association with the divided areas. The access processing unit 11 acquires from the encryption-key storage 13 one of the encryption keys corresponding to one of the divided areas in which data is to be written, encrypts the data by using the acquired encryption key, and writes the encrypted data in the divided area in which the data is to be written.

In the example of FIG. 1, the physical storage areas in the storage devices 31 and 32 are divided into four divided areas A1 to A4, and the physical storage areas in the storage devices 33 and 34 are divided into four divided areas A11 to A14. At this time, the storage devices 31 and 32 belong to a RAID group in which data recording is controlled at a first predetermined RAID level, and the storage devices 33 and 34 belong to another RAID group in which data recording is controlled at a second predetermined RAID level, where RAID stands for Redundant Arrays of Inexpensive Disks.

The data invalidation unit 12 performs processing for invalidating data stored in one of the storage devices 31 to 34 in response to an instruction from the management apparatus 20. In order to invalidate the data stored in the storage devices 31 to 34, the data invalidation unit 12 can use a method of substantially erasing data stored in a divided area by invalidating an encryption key for use in encryption of the data stored in the divided area and therefore making the data stored in the divided area unable to be read out. At this time, the invalidation of an encryption key means removing or replacing of an encryption key.

The management apparatus 20 contains, for example, a data-invalidation control unit 21. The functions of the data-invalidation control unit 21 are realized when a CPU (central processing unit) contained in the management apparatus 20 executes a predetermined program. The data-invalidation control unit 21 instructs the data invalidation unit 12 to invalidate data stored in a virtual storage area, at a time, for example, when use of the virtual storage area is completed. In addition, the data-invalidation control unit 21 invalidates an encryption key for use in encryption of data to be stored in a divided area allocated for a virtual storage area in which stored data is to be invalidated.

In the storage system 1, virtual storage areas can be constructed by virtual allocation of the physical storage areas in the storage devices 31 to 34 on the divided-area basis. In other words, the virtual storage areas in the storage system 1 are constructed in such a manner that the units of the physical storage area allocated for the virtual storage areas correspond to the unit storage areas (divided areas) for which the encryption keys are respectively set.

Therefore, when the data-invalidation control unit 21 instructs the data invalidation unit 12 to invalidate an encryption key associated with a divided area allocated for a virtual storage area in which stored data is to be invalidated, the data-invalidation control unit 21 can make the data invalidation unit 12 perform processing for invalidating the stored data based on the invalidation of the encryption key. Thus, it is possible to invalidate the data stored in the virtual storage area, in a short time, by using the invalidation of the encryption key.

In the example of FIG. 1, the virtual storage areas 41 and 42 are constructed, where the divided areas A1, A2, A11, and A12 (as physical storage areas) are allocated for the virtual storage area 41, and the divided areas A3, A4, A13, and A14 (as physical storage areas) are allocated for the virtual storage area 42. For example, when use of the virtual storage area 42 is completed, the data-invalidation control unit 21 instructs the data invalidation unit 12 to invalidate the encryption key corresponding to each of the divided areas A3, A4, A13, and A14. When the data invalidation unit 12 receives the instruction to invalidate the encryption key, the data invalidation unit 12 invalidates the encryption key which is associated with each of the divided areas A3, A4, A13, and A14 by reference to the encryption-key storage 13. Therefore, the data stored in the virtual storage area 41 are invalidated by the invalidation of the encryption keys, i.e., by an operation which can be performed in a short time.

In addition, the divided area in which stored data is invalidated can be made to transition to a state in which the divided area can be allocated for another virtual storage area. In this case, each divided area which has been allocated for a first virtual storage area becomes able to be allocated for a second virtual storage area in a short time after the use of the first virtual storage area is completed. Therefore, the physical storage areas can be efficiently used.

2. Second Embodiment

The second embodiment is explained below.

2.1 Configuration of Storage System

Figure 2:
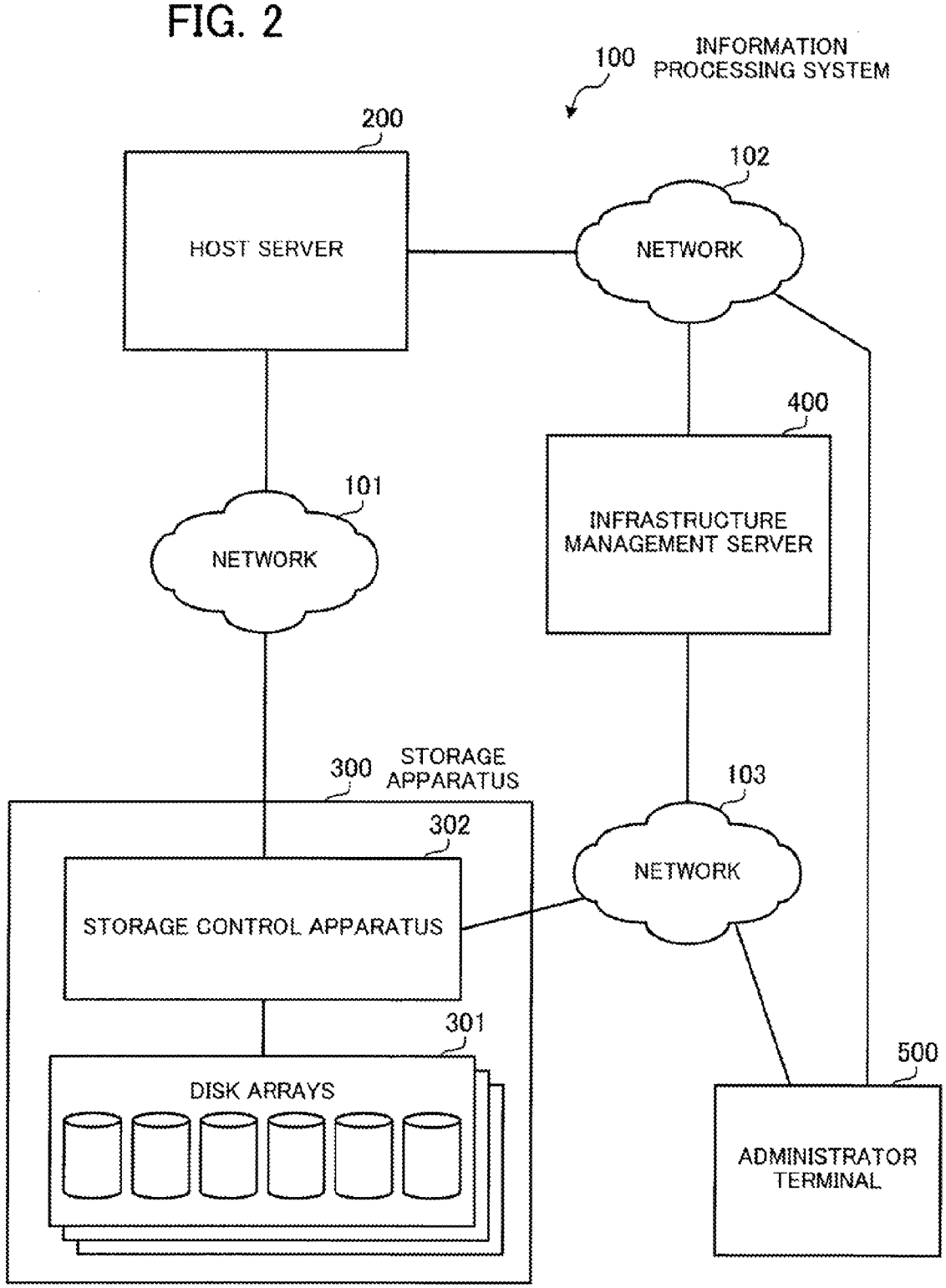
FIG. 2 illustrates an example of a configuration of an information processing system according to a second embodiment.

FIG. 2 illustrates an example of a configuration of an information processing system according to the second embodiment. The information processing system 100 of FIG. 2 includes a host server 200, a storage apparatus 300, an infrastructure management server 400, and an administrator terminal 500.

The host server 200 and the storage apparatus 300 are connected through a network 101. The network 101 is an SAN (Storage Area Network) through which communication is performed in accordance with FC, iSCSI, or the like, where FC stands for Fibre Channel, and iSCSI stands for Internet Small Computer System Interface. The host server 200, the infrastructure management server 400, and the administrator terminal 500 are connected with each other through a network 102, and the storage apparatus 300, the infrastructure management server 400, and the administrator terminal 500 are connected with each other through a network 103. The networks 102 and 103 are LANs (Local Area Networks) through which communication is performed in accordance with TCP/IP (Transmission Control Protocol/Internet Protocol) or the like.

The host server 200 constructs virtual machines, which are virtualized servers. Specifically, in order to construct the virtual machines, the host server 200 allocates, by software control, the hardware resources provided in the host server 200 and the storage resources realized by storage devices provided in the storage apparatus 300.

The storage apparatus 300 contains one or more disk arrays 301 and a storage control apparatus 302. Each of the one or more disk arrays 301 contains multiple HDDs. At least part of physical storage areas provided in the HDDs in the one or more disk arrays 301 are allocated for virtual disks (storage areas in the virtual machines). Alternatively, the storage devices mounted in the one or more disk arrays 301 may be SSDs (solid-state drives).

The storage control apparatus 302 accesses the HDDs in the one or more disk arrays 301 in response to an access request from the host server 200 or the like. The storage control apparatus 302 has a function of encrypting data to be stored in the one or more disk arrays 301 and a function of generating an encryption key for use in the encryption and decryption. In addition, the storage control apparatus 302 is capable of changing the encryption keys in response to a request from the infrastructure management server 400.

The infrastructure management server 400 manages, by use of various tables, physical storage areas which can be allocated for the virtual disks of the virtual machines, among the physical storage areas provided by the HDDs in the one or more disk arrays 301. The physical storage areas which can be allocated for the virtual disks of the virtual machines constitute a storage pool, and the infrastructure management server 400 allocates part or all of the physical storage areas in the storage pool for the virtual disks in response to a request from the host server 200.

In addition, when use of a virtual disk is completed, and one or more physical storage areas which have been allocated for the virtual disk are released, the infrastructure management server 400 makes the storage control apparatus 302 erase the data stored in the released physical storage areas. The basic methods for data erasure include overwriting with a predetermined value such as "0" and change of the encryption key which has been used in storing the data in the released physical storage areas.

The administrator terminal 500 is a terminal operated by an administrator who manages the information processing system 100. The administrator can make settings in the storage apparatus 300, which include, for example, settings of logical volumes and the storage pool, new setting of virtual servers and virtual disks, and the like.

2.2 Hardware of Storage Control Apparatus

Figure 3:
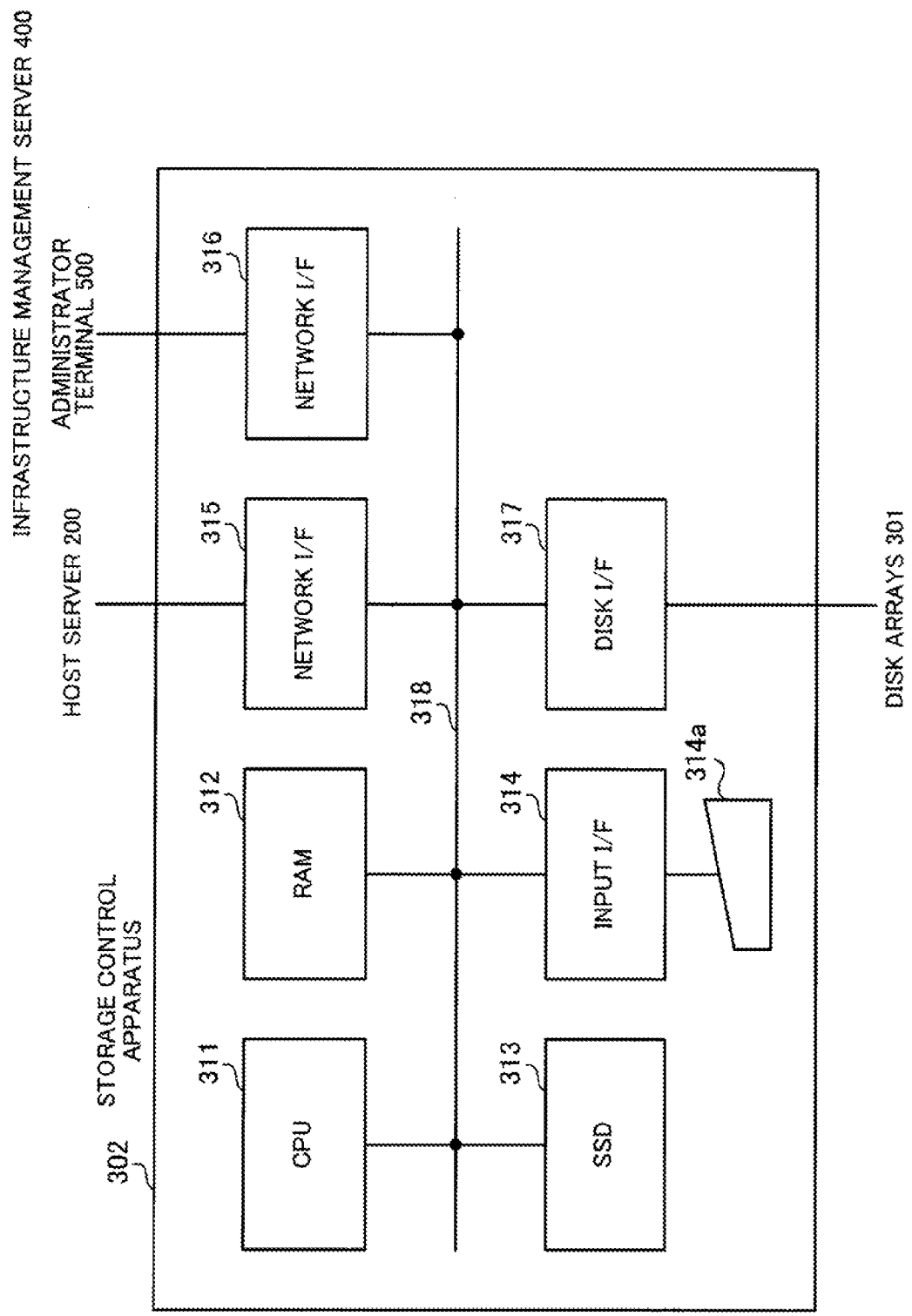
FIG. 3 illustrates an example of a hardware construction of a storage control apparatus in the second embodiment.

FIG. 3 illustrates an example of a hardware construction of the storage control apparatus 302 in the second embodiment. The entire storage control apparatus 302 is controlled by a CPU 311. A RAM (random access memory) 312 and more than one peripheral device are connected to the CPU 311 through a bus 318. The RAM 312 is used as a main storage of the storage control apparatus 302, and temporarily stores at least portions of programs executed by the CPU 311 and various data needed in processing in accordance with the programs. For example, an SSD 313, an input interface (I/F) 314, network interfaces (I/Fs) 315 and 316, and a disk interface (I/F) 317 are connected as the more than one peripheral device to the CPU 311.

The SSD 313 is used as a secondary storage of the storage control apparatus 302, and stores programs to be executed by the CPU 311 and various data needed in execution of the programs. Alternatively, another type of nonvolatile storage device, for example, an HDD may be used as the secondary storage.

An input device 314a having operation keys and the like is connected to the input I/F 314. The input I/F 314 outputs to the CPU 311 signals corresponding to manipulation inputs into the input device 314a. The network I/F 315 transmits and receives data to and from the host server 200 through the network 101. The network I/F 316 transmits and receives data to and from the infrastructure management server 400 and the administrator terminal 500 through the network 103. The disk I/F 317 performs communication with the HDDs in the one or more disk arrays 301 in accordance with, for example, the SAS (Serial Attached SCSI) standard. (SCSI stands for Small Computer System Interface.)

Further, each of the host server 200, the infrastructure management server 400, and the administrator terminal 500 can be realized by a hardware construction similar to the storage control apparatus 302.

2.3 Allocation of Storage Areas

Figure 4:
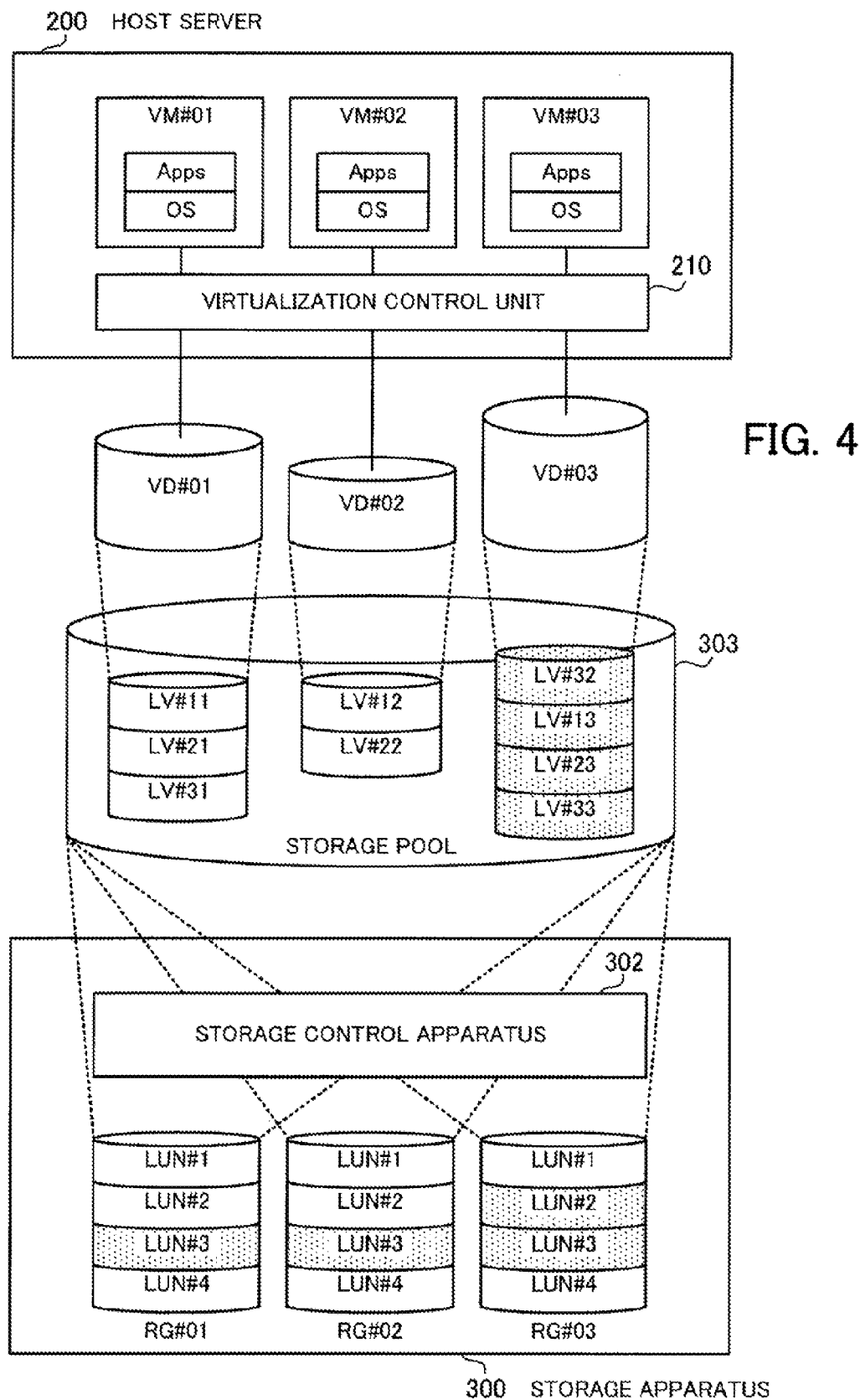
FIG. 4 illustrates an example of allocation of storage areas for virtual disks in the second embodiment.

FIG. 4 illustrates an example of allocation of storage areas for virtual disks in the second embodiment.

The host server 200 contains a virtualization control unit 210, and constructs virtual machines under control of the virtualization control unit 210. In the example of FIG. 4, three virtual machines VM#01, VM#02, and VM#03 are constructed. An OS program and various application programs are executed on each virtual machine under control of the virtualization control unit 210. (In FIG. 4, the application programs are indicated as "Apps".)

A virtual disk as a storage resource is allocated to each virtual machine. In the example of FIG. 4, the virtual disks VD#01, VD#02, and VD#03 are respectively allocated to the virtual machines VM#01, VM#02, and VM#03. The storage areas in the virtual disks are allocated from a storage pool 303.

In the storage pool 303, physical storage areas which can be allocated for the virtual disks of the virtual machines, among the physical storage areas provided by the HDDs in the one or more disk arrays 301, are registered on the logical-volume basis. The logical volumes are logical storage areas having identical storage capacity. The logical volumes registered in the storage pool 303 and the status of use of each logical volume are managed by the infrastructure management server 400 by using a storage-pool management table (which is held by the infrastructure management server 400 and explained later).

Unused logical volumes among the logical volumes registered in the storage pool 303 are allocated for the virtual disks. In the example of FIG. 4, logical volumes LV#11, LV#21, and LV#31 are allocated for the virtual disk VD#01, logical volumes LV#12 and LV#22 are allocated for the virtual disk VD#02, and logical volumes LV#32, LV#13, LV#23, and LV#33 are allocated for the virtual disk VD#03. The storage capacity of each virtual disk can be increased or decreased as needed, by newly allocating one or more logical volumes from the storage pool 303 for the virtual disk or releasing one or more logical volumes from the virtual disk. In the storage control apparatus 302, the logical volumes newly allocated for the virtual disks are managed as currently-used logical volumes, and the logical volumes released from the virtual disks are managed as unused logical volumes.

On the other hand, the storage control apparatus 302 manages, for each RAID group, the physical storage areas provided in the HDDs in the one or more disk arrays 301. Each RAID group is a logical storage area realized by combining physical storage areas in multiple HDDs. An arbitrary RAID level can be set for each RAID group, and the storage control apparatus 302 controls the data stored in each RAID group so that the data are stored in multiple HDDs with redundancy in accordance with a procedure corresponding to the RAID level which is set as above.

Each RAID group is divided into logical storage areas which are hereinafter referred to as logical units. For example, the logical units have identical storage capacity. The storage control apparatus 302 manages each RAID group on the logical-unit basis. In the example of FIG. 4, three RAID groups RG#01, RG#02, and RG#03 are set, and each of the RAID groups RG#01 to RG#03 is divided into four logical units LUN#1, LUN#2, LUN#3, and LUN#4. The logical units LUN#1 to LUN#4 in each of the RAID groups RG#01 to RG#03 constitute at least part of the physical storage areas in the storage pool 303.

Further, the storage control apparatus 302 has a function of encrypting data to be stored in storage areas constituting a RAID group, and a function of generating an encryption key for use in the data encryption. The storage control apparatus 302 encrypts data by using an encryption key unique to each logical unit in each RAID group. In other words, each logical unit is a storage area in which stored data can be encrypted by using an encryption key unique to the storage area. In addition, the storage control apparatus 302 can make the data stored in each logical unit completely unreadable by changing an encryption key used in storing the data in the logical unit. That is, the change of the encryption key used in the data stored in each logical unit enables substantial erasion of the data stored in the logical unit.

Incidentally, when use of a virtual machine is completed, use of the virtual disk allocated to the virtual machine is also completed. In many case, the user of a virtual machine wishes to completely erase the data stored in the virtual disk allocated to the virtual machine when use of the virtual machine is completed.

A conceivable method for completely erasing data is overwriting with other data (e.g., all-zero data), and a conceivable method for substantially completely erasing data is change of the encryption key. According to the former method, the operation of overwriting data in the entire storage area in the virtual disk for erasion of all the data takes a very long time. In the latter method, data stored in an encrypted form in a virtual disk are substantially completely erased by changing the encryption key. According to the latter method, because of the change of the encryption key, it is impossible to read out the encrypted data from the outside of the storage control apparatus 302 by using the encryption key which has been used before the change. In addition, according to the latter method, the data can be erased in a very short time only by the change of the encryption key.

According to the present embodiment, in order to realize the complete erasion of the data in a virtual disk by the change of the encryption key, the storage areas are allocated for the virtual disk on the logical-unit bases, where a unique encryption key is used in encryption of data stored in each logical unit. In other words, the logical units managed by the storage control apparatus 302 are in a one-to-one correspondence with the logical volumes registered in the storage pool 303, which are the units of allocation for the virtual disk. Thus, it is possible to completely erase the data stored in a virtual disk the use of which is completed, by requesting the storage control apparatus 302 to change the encryption key for every logical unit allocated for the virtual disk.

In the example of FIG. 4, the logical volumes LV#32, LV#13, LV#23, and LV#33 are allocated for the virtual disk VD#03. At this time, it is assumed that the logical volume LV#32 is associated with the logical unit LUN#2 in the RAID group RG#3, the logical volume LV#13 is associated with the logical unit LUN#3 in the RAID group RG#1, the logical volume LV#23 is associated with the logical unit LUN#3 in the RAID group RG#2, and the logical volume LV#33 is associated with the logical unit LUN#3 in the RAID group RG#3. In this case, for example, it is possible to completely erase the data stored in the virtual disk VD#03 by requesting the storage control apparatus 302 to change the encryption key for each of the logical unit LUN#2 in the RAID group RG#3, the logical unit LUN#3 in the RAID group RG#1, the logical unit LUN#3 in the RAID group RG#2, and the logical unit LUN#3 in the RAID group RG#1.

If the logical units are not associated with the logical volumes in a one-to-one correspondence, it is impossible to completely erase data on the virtual-disk basis by changing the encryption key. Assume, for example, that the logical volumes LV#11 and LV#12 are associated with the logical unit LUN#1 in the RAID group RG#01, and the logical volumes are allocated for the virtual disks as illustrated in FIG. 4 (i.e., the logical volume LV#11 is allocated for the virtual disk VD#01 and the logical volume LV#12 is allocated for the virtual disk VD#02). In the above (imaginary) case, when an attempt is made to erase the data in the logical volume LV#12 (allocated for the virtual disk VD#01) by changing the encryption key, the data in the logical volume LV#11 in the virtual disk VD#01 is also erased. Therefore, it is impossible to erase all the data in the virtual disk VD#02 by the change of the encryption key.

2.4 Processing Functions

Figure 5:
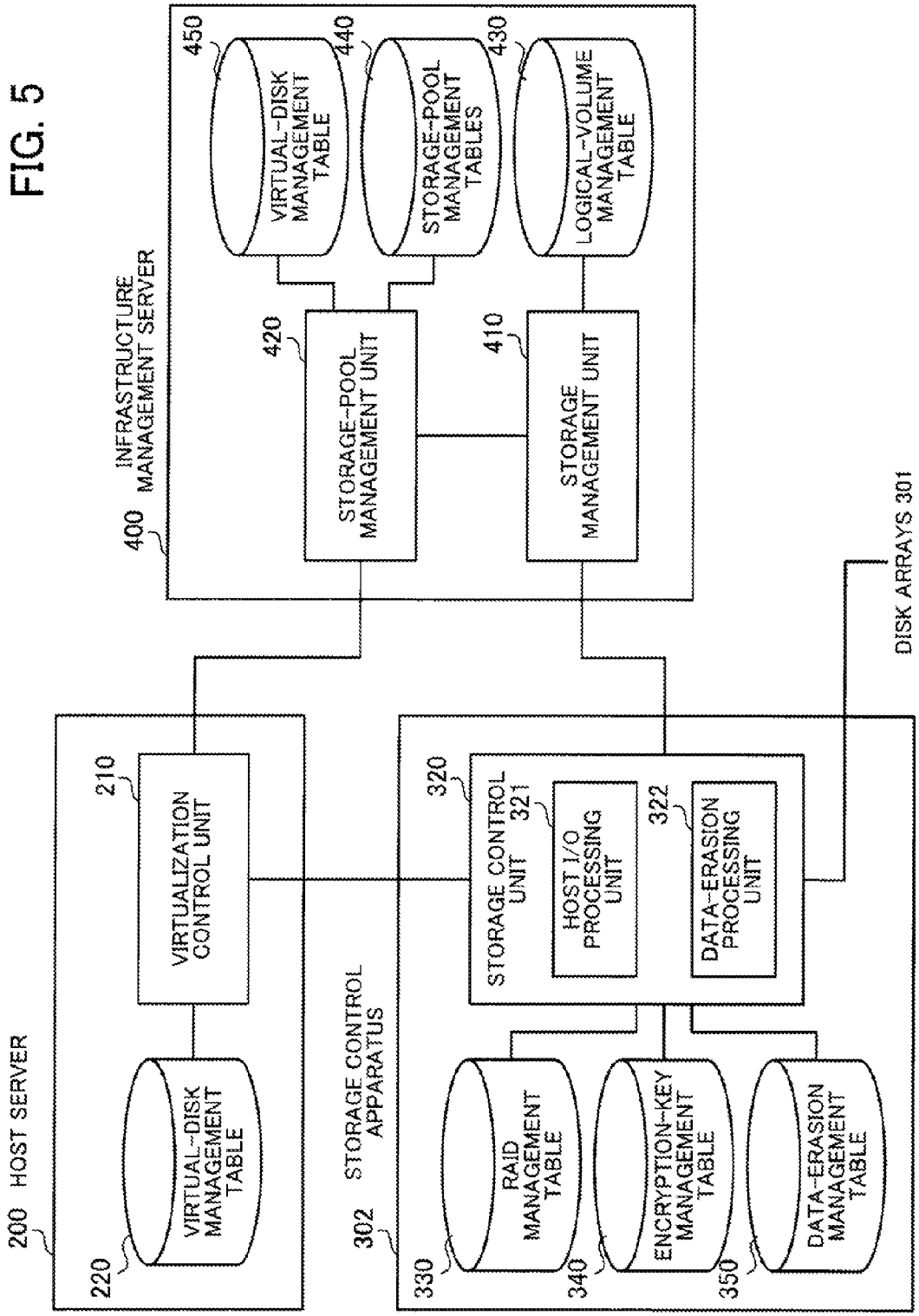
FIG. 5 illustrates examples of processing functions of a host server, a storage control apparatus, and an infrastructure management server in the information processing system according to the second embodiment.

FIG. 5 illustrates examples of processing functions of the host server 200, the storage control apparatus 302, and the infrastructure management server 400 in the information processing system according to the second embodiment.

The host server 200 contains the aforementioned virtualization control unit 210. The processing functions of the virtualization control unit 210 are realized when the CPU in the host server 200 executes a virtualization control program, which is called, for example, a hypervisor. The virtualization control unit 210 constructs virtual machines and controls the operations of the virtual machines. In addition, the virtualization control unit 210 requests the storage control apparatus 302 to access virtual disks allocated to the virtual machines.

A virtual-disk management table 220 is stored in a nonvolatile storage device (e.g., an SSD or HDD) provided in the host server 200. Information on the virtual disks allocated to the virtual machines is recorded in the virtual-disk management table 220. The information on the virtual disks includes the numbers indicating the logical volumes in the storage pool 303 allocated for the virtual disks and information on the logical units corresponding to the logical volumes. When the virtualization control unit 210 accesses the virtual disks, the virtualization control unit 210 can determine the address (the logical block address in a RAID group) of the physical storage area to be accessed, on the basis of the information recorded in the virtual-disk management table 220.

The storage control apparatus 302 contains a storage control unit 320. The processing functions of the storage control unit 320 are realized, for example, when the CPU 311 in the storage control apparatus 302 executes a predetermined program. In addition, a RAID management table 330, an encryption-key management table 340, and a data-erasion management table 350 are stored in a nonvolatile storage device (e.g., the SSD 313) provided in the storage control apparatus 302.

Information for each RAID group is recorded in the RAID management table 330, where the information for each RAID group includes the RAID level which is set for the RAID group, the numbers indicating the HDDs constituting the RAID group, and the numbers indicating the logical units belonging to the RAID group. In the encryption-key management table 340, an encryption key for use in storing data in each logical unit is recorded.

The storage control unit 320 contains a host I/O processing unit 321. (I/O stands for In/Out.) The host I/O processing unit 321 accesses the HDDs in the one or more disk arrays 301 in response to a request from the virtualization control unit 210 in the host server 200. When the host I/O processing unit 321 accesses the HDDs in the one or more disk arrays 301, the host I/O processing unit 321 performs processing according to the RAID level which is set for the RAID group to be accessed, by reference to the RAID management table 330. In addition, in the case where an encryption key is set in the encryption-key management table 340 for a logical unit to be accessed, the host I/O processing unit 321 encrypts data to be stored in the logical unit and decrypts data read out from the logical unit data by using the encryption key which is set in the encryption-key management table 340 for the logical unit.

The storage control unit 320 further contains a data-erasion processing unit 322. When use of a virtual disk is completed, the data-erasion processing unit 322 performs processing for erasing data stored in the logical unit corresponding to the virtual disk, in response to a request from the infrastructure management server 400. As explained later, according to the present embodiment, the data stored in a virtual disk can be erased in either of first, second, and third processing modes (data-erasion modes). The data-erasion processing unit 322 refers to the data-erasion management table 350 when the data-erasion processing unit 322 erases data in the third data-erasion mode.

Information indicating physical storage areas of which overwriting is completed and physical storage areas of which overwriting is not completed, among the physical storage areas corresponding to virtual disks the use of which is completed, is recorded in the data-erasion management table 350. In addition, the data-erasion management table 350 is also referred to when the host I/O processing unit 321 writes data in the HDDs in the one or more disk arrays 301.

The infrastructure management server 400 contains a storage management unit 410 and a storage-pool management unit 420. The processing functions of each of the storage management unit 410 and the storage-pool management unit 420 are realized, for example, when the CPU in the infrastructure management server 400 executes a predetermined program. In addition, a logical-volume management table 430, storage-pool management tables 440, and a virtual-disk management table 450 are stored in one or more nonvolatile storage devices (e.g., an SSD or HDD) provided in the infrastructure management server 400.

The storage management unit 410 makes settings for the logical units in response to a request from the administrator terminal 500. The storage management unit 410 registers in the logical-volume management table 430 a correspondence between each logical unit which is set as above and a logical volume in the storage pool 303. In addition, when use of a virtual disk is completed, the storage management unit 410 makes the storage control apparatus 302 perform processing for erasing data stored in the virtual disk.

The storage-pool management unit 420 manages the state of use of the logical volumes in the storage pool 303 by using the storage-pool management tables 440. In each of the storage-pool management tables 440, a list of logical volumes which can be allocated for the virtual disks and the status of each logical volume are recorded. In addition, in response to a request from the virtualization control unit 210 in the host server 200, the storage-pool management unit 420 allocates for a virtual disk one or more unused logical volumes among the logical volumes registered in the storage-pool management tables 440. Further, the storage-pool management unit 420 manages the one or more logical volumes allocated for the virtual disk, by using the virtual-disk management table 450. In the virtual-disk management table 450, a list of the virtual machines (virtual servers) and virtual disks for the virtual machines, one or more numbers indicating the one or more logical volumes allocated for each virtual disk, and a data-erasion policy for each virtual disk are recorded. The data-erasion policy is information indicating one of the first, second, and third processing (data-erasion) modes in which the data stored in each virtual disk is to be erased when use of the virtual disk is completed.

2.5 RAID Management Table

Figure 6:
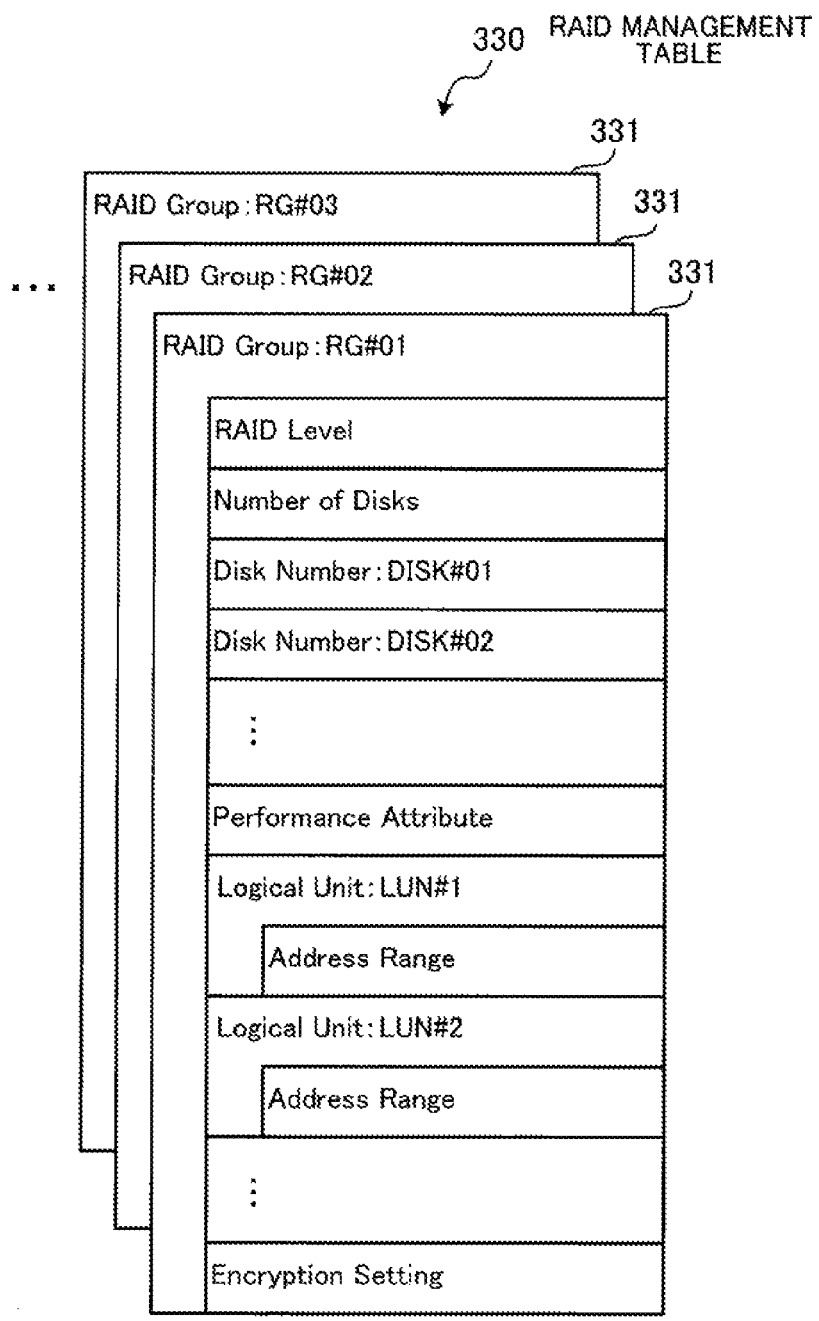
FIG. 6 illustrates examples of information items recorded in a RAID management table.

FIG. 6 illustrates examples of information items recorded in the RAID management table 330. A record 331 is produced for each RAID group in the RAID management table 330. In each record 331, an identification number for identifying the corresponding RAID group is recorded. In addition, the information items of "RAID Level", "Number of Disks", "Disk Number", "Performance Attribute", "Logical Unit", "Encryption Setting" are recorded in each record 331.

The information item "RAID Level" indicates the RAID level which is set for the RAID group corresponding to each record 331. The information item "Number of Disks" indicates the number of HDDs belonging to the corresponding RAID group. The information items "Disk Number" indicate identification numbers of the respective HDDs belonging to the RAID group corresponding to each record 331. The number of the information items "Disk Number" recorded for the RAID group is equal to the number which is set as the information item "Number of Disks" for the RAID group.

The information item "Performance Attribute" indicates the attribute information corresponding to the access performance. For example, the attribute information is such that types of storage devices having similar access performance are classified into a group having identical attribute information. The attribute information may be, for example, "SSD", "SAS/FC Drive", "NL (Nearline)/SATA (Serial ATA)", or the like, where ATA stands for AT Attachment. It is assumed that all the storage devices belonging to the same RAID group have an identical information item "Performance Attribute".

The information items "Logical Unit" indicate identification numbers of the respective logical units in the RAID group corresponding to the record 331. The information items "Address Range" each indicate the range of addresses (e.g., LBAs (Logical Block Addresses)) of the corresponding logical unit in the corresponding RAID group. The information item "Encryption Setting" is information indicating whether or not data to be stored in the HDDs belonging to the corresponding RAID group is to be encrypted.

2.6 Encryption-Key Management Table

Figure 7:
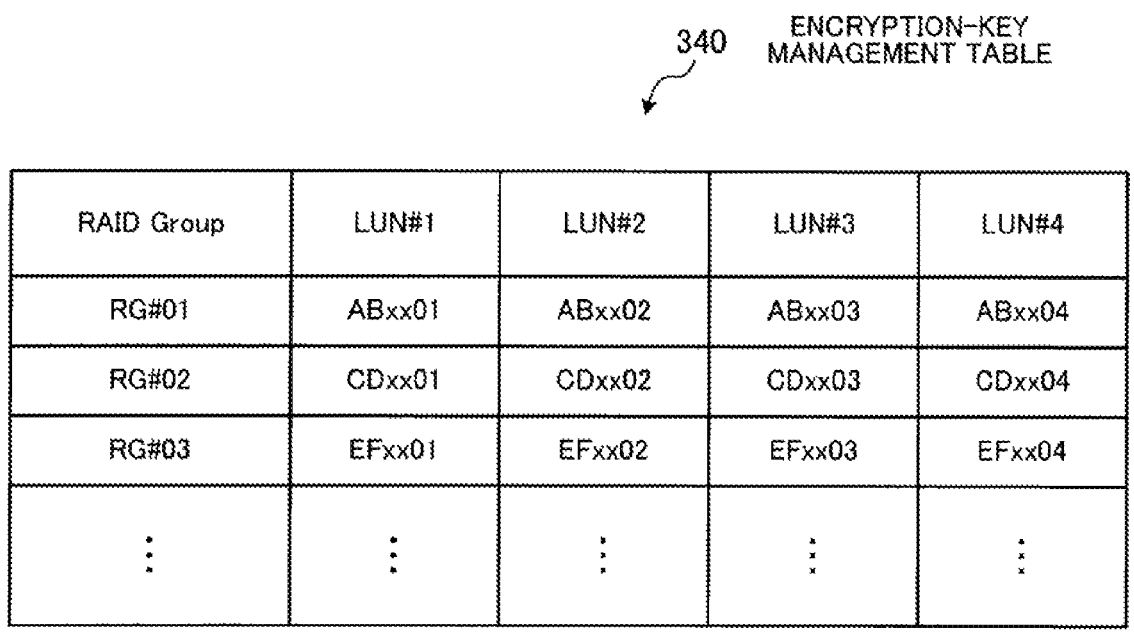
FIG. 7 illustrates examples of information items recorded in an encryption-key management table.

FIG. 7 illustrates examples of information items recorded in the encryption-key management table 340. In the encryption-key management table 340, an encryption key for use in encryption of data which is to be stored and decryption of data which is read out is recorded for each logical volume which is set in each RAID group. The host I/O processing unit 321 in the storage control apparatus 302 has a function of generating a random encryption key, and an encryption key unique to each logical volume is recorded in the encryption-key management table 340. No encryption key is recorded for each logical volume in each RAID group which is set not to encrypt stored data, and an indication "NULL" is recorded for such a logical volume. Alternatively, it is possible to record information in the encryption-key management table 340 for only one or more RAID groups which are set to encrypt stored data.

2.7 Data-Erasion Management Table

FIG. 8 illustrates examples of information items recorded in the data-erasion management table 350. In the data-erasion management table 350, the identification numbers of a logical volume and a RAID group corresponding to each virtual disk the use of which is completed are recorded in association with the identification numbers of the virtual disk and the corresponding virtual machine. The information recorded in the data-erasion management table 350 is limited to only the information for the virtual disk(s) and the virtual machine(s) which are set to erase data in the aforementioned third (data-erasion) processing mode when use of each of the virtual disk(s) is completed.

Further, each logical unit is divided into unit areas, and the overwriting for data erasion is performed on the unit-area basis. In the data-erasion management table 350, the leading LBAs of unit areas erased or to be erased are recorded for indicating the unit areas. In the example of FIG. 8, "0x00000010", "0x00000011", . . . are the leading LBAs of unit areas erased or to be erased. In addition, the operational status of the overwriting of each unit area in each logical unit is recorded in association with the leading LBA of the unit area in the data-erasion management table 350, where the operational status "Overwritten" indicates that the corresponding unit area is already overwritten, and the operational status "Unprocessed" indicates that the corresponding unit area is not yet overwritten.

2.8 Logical-Volume Management Table

Figure 9:
FIG. 9 illustrates examples of information items recorded in a logical-volume management table.

FIG. 9 illustrates examples of information items recorded in the logical-volume management table 430. In the logical-volume management table 430, the number indicating a logical volume corresponding to each combination of a RAID group and a logical unit is recorded. That is, in the logical-volume management table 430, the logical units managed by the storage control unit 320 are respectively associated with the logical volumes in the storage pool 303.

2.9 Storage-Pool Management Tables

FIG. 10 illustrates examples of information items recorded in one of the storage-pool management table 440. In the storage-pool management tables 440, the status of use of each logical volume in the storage pool 303 is recorded, where the status "Currently Used" indicates that the corresponding logical volume is currently allocated for a virtual disk, the status "Unused" indicates that the corresponding logical volume is available for allocation for a virtual disk, and the status "Being Initialized" indicates that the corresponding logical volume is currently being overwritten.

2.10 Virtual-Disk Management Tables

FIG. 11 illustrates examples of information items recorded in the virtual-disk management table 450. In the virtual-disk management table 450, the information items "Data-erasion Mode" and "Constituent LUN" are recorded for each virtual server (machine) and the corresponding virtual disk. The information item "Data-erasion Mode" indicates information indicating one of the first, second, and third (erasion) processing modes in which the data stored in each virtual disk is to be erased when use of the virtual disk is completed. As explained later, overwriting is performed in the first and third modes, while overwriting is not performed in the second mode. In addition, the information items "Constituent LUN" indicate the identification numbers of logical volumes in the storage pool 303 which are allocated for each virtual disk.

Further, similarly to the virtual-disk management table 450, in the virtual-disk management table 220 in the host server 200, the identification numbers of the logical volumes in the storage pool 303 allocated for each virtual disk are also recorded in association with the identification numbers of each virtual server and the corresponding virtual disk. Furthermore, information on the logical units corresponding to the allocated logical volumes is also recorded in the virtual-disk management table 220.

2.11 Modes of Data Erasion

The data-erasion processing which is performed when use of a virtual machine is completed is explained below.

The information processing system 100 according to the present embodiment provides a service of erasing data stored in a virtual disk allocated to a virtual machine the use of which is completed. The data erasion in the above service is not performed in a manner which leaves substantive data in HDDs, although substantive data are left in HDDs when data erasion is realized by merely changing settings for data storage areas in a file system. Instead, the data erasion according to the present embodiment is performed in a manner which makes the stored data completely unreadable from the outside of the storage apparatus 300. The data erasion according to the present embodiment (completely erasing data as above) is performed in one of the first, second, and third erasion (processing) modes according to information which is preset for each virtual disk by a user.

2.11.1 First Data-Erasion Mode

In the first data-erasion mode, data stored in each logical volume allocated for a virtual disk the use of which is completed is completely erased by overwriting the stored data with arbitrary data (e.g., all-zero data), which is hereinafter referred to as initialization data. In the first data-erasion mode, the operation of overwriting the stored data with the initialization data is immediately started when use of the virtual disk is completed. In the data-erasion processing in the first data-erasion mode, each logical volume allocated for a virtual disk the use of which is completed is not allowed to be allocated for any of the other virtual disks until the overwriting of the entire storage area of the logical volume is completed. Specifically, the status of use of each logical volume to be overwritten is set to "Being Initialized" in the storage-pool management tables 440 after the overwriting is started until the overwriting of the entire storage area of the logical volume is completed. Thereafter, when the overwriting of the entire storage area of the logical volume is completed, the status of use of the logical volume is changed to "Unused".

As explained above, the data-erasion processing in the first data-erasion mode is advantageous to the users in that the stored data can be completed erased. However, the data-erasion processing in the first data-erasion mode is disadvantageous to the service provider in that it takes a long time after the use of a virtual disk is completed until reuse of each logical volume which has been allocated for the virtual disk is allowed. In addition, since the data overwriting is performed by the CPU 311 in the storage control apparatus 302, there is a possibility that the performance of access to the other virtual disks is lowered.

Incidentally, it is not absolutely necessary to encrypt data to be stored in each physical storage area allocated for a virtual disk for which the first data-erasion mode is set to be performed. In the case where the data is not encrypted, it is possible to increase the performance of access to the virtual disk. However, even in the case where the first data-erasion mode is set for the virtual disk, one or more HDDs constituting the virtual disk may be dismounted from the one or more disk arrays 301. Therefore, the data encryption of the data stored in the one or more HDDs can prevent illegal reading of data stored in the one or more HDDs dismounted from the one or more disk arrays 301.

2.11.2 Second Data-Erasion Mode

In the data-erasion processing performed in the second data-erasion mode, data to be stored in each logical volume allocated for a virtual disk is encrypted. Thereafter, when use of the virtual disk is completed, the data stored in the logical volume is substantially completely erased by changing the encryption key which has been used in the encryption of the data stored in the logical volume. Alternatively, the encryption key may be simply erased, instead of being changed.

Thus, in the data-erasion processing performed in the second data-erasion mode, the data stored in each logical volume allocated for a virtual disk the use of which is completed is erased by merely changing or erasing the encryption key which is associated, in the encryption-key management table 340, with the logical volume. Therefore, it is possible to completely erase the data stored in the logical volume and make the logical volume transition to a reusable state, in a short time after the use of the virtual disk is completed.

2.11.3 Third Data-Erasion Mode

As mentioned above, in the data-erasion processing performed in the second data-erasion mode, each logical volume allocated for a virtual disk the use of which is completed becomes reusable in a short time after the completion of the use of the virtual disk. Therefore, the data-erasion processing performed in the second data-erasion mode is greatly advantageous in that the service provider which provides the virtual disks can efficiently use the limited storage resources. However, many users still demand for data erasion by overwriting with initialization data similar to the first data-erasion mode, instead of the data erasion only by changing the encryption key as in the second data-erasion mode, and therefore some customers may not be satisfied with the data-erasion processing performed in the second data-erasion mode.

In order to satisfy the demands by the customers, in the data-erasion processing performed in the third data-erasion mode, overwriting with initialization data is performed, and the demand by the service provider for efficient use of the storage resources is also satisfied. That is, in the data-erasion processing performed in the third data-erasion mode, both of the data erasion by changing the encryption key and the data erasion by overwriting with initialization data are performed. Specifically, in the data-erasion processing performed in the third data-erasion mode, when use of a virtual disk is completed, an encryption key used in storing data in each logical volume which has been allocated for the virtual disk is changed. When the encryption key for the logical volume is changed, the logical volume is immediately made to transition to a reusable state. In addition, the data erasion by overwriting with initialization data in the third data-erasion mode is performed asynchronously with the timing at which the use of the virtual disk is completed. For example, the operation of overwriting, with initialization data, the virtual disk the use of which is completed is performed when the storage apparatus 300 has no request for access to the other virtual disks which is received after the use of the virtual disk is completed.

Further, in the data-erasion processing performed in the third data-erasion mode, only the part of each logical volume in which new data is not written after the completion of use of the virtual disk (to which the logical volume has been allocated) is overwritten with the initialization data. For example, each logical volume which is made to transition to a reusable state can be allocated for another virtual disk before the logical volume is overwritten with the initialization data, and it is considerably probable that new data is written in the logical volume in response to a request from the virtualization control unit 210 in the host server 200 after the logical volume is allocated for the other virtual disk.

As described above, the overwriting with the initialization data is not performed on the part of the logical volume in which new data is written in response to a request from the host server 200 after the use of the virtual disk for which the logical volume has been allocated is completed. Therefore, immediately after the use of the virtual disk is completed, the overwriting with the initialization data can be performed, and the logical volume allocated for the virtual disk the use of which is completed can be made reusable. Thus, it is possible to satisfy both of the demand by the service provider for efficient use of storage resources and the demands by the customers for data erasion by overwriting with initialization data.

In addition, since the overwriting with initialization data is performed asynchronously with the timing at which the use of the virtual disk is completed, it is possible to disperse the load imposed on the storage control apparatus 302, and reduce the influence of the processing for the overwriting on the performance of access to the other virtual disks which are currently being used.

Further, since the part of each logical volume in which new data is written after the completion of use of the virtual disk (to which the logical volume has been allocated) in response to a request from the host server 200 is not overwritten with the initialization data, the area which is overwritten with initialization data can be reduced. In the case where the area which is overwritten with initialization data is reduced, the time needed for overwriting is reduced, and therefore the burden imposed on the storage control apparatus 302, which performs the data-erasion processing, can be reduced.

Alternatively, in the data-erasion processing performed in the third data-erasion mode, the overwriting with initialization data may be performed immediately after the use of the virtual disk is completed.

Further alternatively, in the data-erasion processing performed in the third data-erasion mode, the data erasion by changing the encryption key may be dispensed with. Even in this case, the logical volume allocated for the virtual disk the use of which is completed immediately becomes reusable, so that the data-erasion processing in the third data-erasion mode without the data erasion by changing the encryption key is still advantageous to the service provider. However, before each logical volume allocated for the virtual disk the use of which is completed is overwritten with initialization data, the data stored in the logical volume remains in the logical volume, and the logical volume storing the data for the virtual disk the use of which is completed immediately becomes reusable after the use of the virtual disk is completed. Therefore, the safety of the stored data in the case where the third data-erasion mode is adopted is lower than the case where the first or second data-erasion mode is adopted. Further, when a logical volume which has been allocated for a first virtual disk is newly allocated for a second virtual disk after the use of the first virtual disk is completed, and new data is written in an area in the logical volume, the original data which has been written in the area is erased. Therefore, in many cases, the original data which have been stored in storage areas of the virtual disk the use of which is completed become substantially unreadable, before all the storage areas in the virtual disk are overwritten with the initialization data.

2.11.4 Settings for Services Using Respective Data-Erasion Modes

Figure 12:
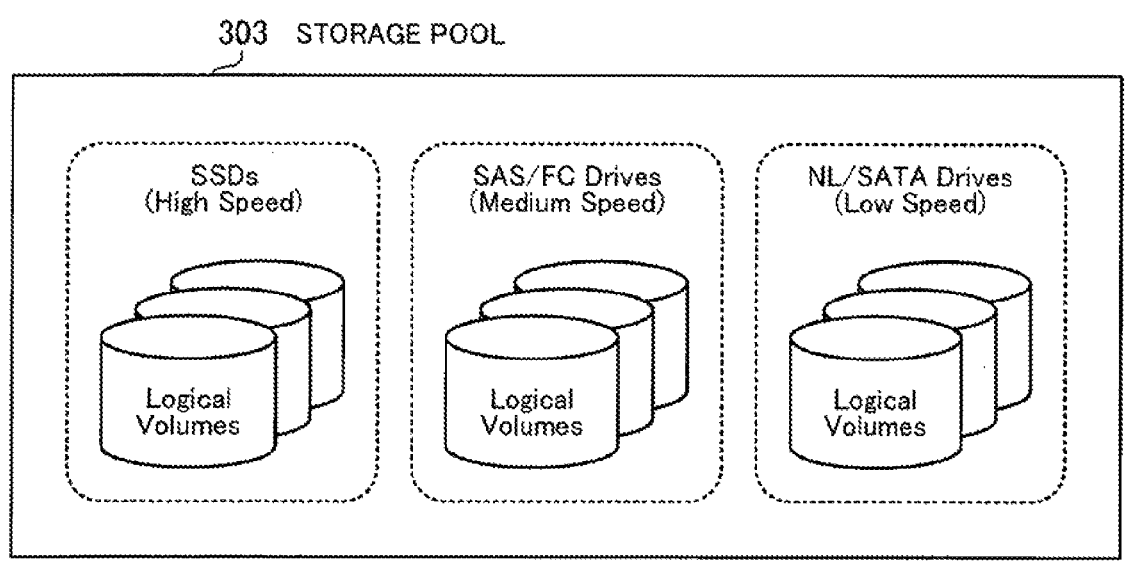
FIG. 12 schematically illustrates examples of logical volumes stored in the storage pool and the performance of access to the logical volumes.

It is possible to configure the information processing system 100 to adopt either of the first, second, and third data-erasion modes according to the performance of the physical storage devices allocated for the virtual disks. FIG. 12 schematically illustrates examples of logical volumes stored in the storage pool and the performance of access to the logical volumes. The storage devices realizing the logical volumes registered in the storage pool 303 (i.e., the storage devices mounted in the storage apparatus 300) may be various types. For example, the storage devices may be HDDs in conformity with SAS (i.e., SAS drives), HDDs in conformity with FC (i.e., FC drives), nearline HDDs (i.e., NL drives), HDDs in conformity with SATA (i.e., SATA drives), SSDs, and the like.

In the information processing system 100, for example, various storage devices which can be allocated for the virtual disks as physical storage areas are classified into groups respectively having different performance attributes in such a manner that storage devices belonging to each group exhibit similar access performance. Therefore, the users can choose the access performance. For example, the SSDs are classified into the group of the fastest storage devices, the NL drives and the SATA drives are classified into the group of the slowest storage devices, and the SAS drives and the FC drives are classified into the group of storage devices having medium speeds.

As illustrated in FIG. 12, the infrastructure management server 400 classifies the logical volumes registered in the storage pool 303 on the basis of the performance attributes which the physical storage areas realizing the logical volumes have, for management of the logical volumes. For example, the infrastructure management server 400 holds one or more of the storage-pool management tables 440 for each of the performance attributes of the physical storage areas realizing the logical volumes. The performance attributes of the physical storage areas realizing the logical volumes can be acquired from the RAID management table 330.

FIGS. 13A and 13B illustrate examples of service correspondence tables 461 and 462, which respectively indicate two different examples of sets of services. Each service in the two sets indicated in the service correspondence tables 461 and 462 adopts a combination of one of the performance attributes, one of the data-erasion modes, and one of usage fees, and the three services in each of the two sets respectively adopt the first, second, and third data-erasion modes.

As indicated in FIG. 13A, in the set of services indicated in the service correspondence table 461, the service A1 adopts the third data-erasion mode, the service B1 adopts the first data-erasion mode, and the service C1 adopts the second data-erasion mode. In the example using the service correspondence table 461, the operation of changing the encryption key is assumed to be performed, in addition to the operation of overwriting with initialization data, in the data-erasion processing in the third data-erasion mode adopted in the service A1. Since the overwriting with initialization data is not performed in the second mode, the storage devices are not required to have high access performance when the service adopts the second data-erasion mode. In contrast with the above, when the service adopts the first data-erasion mode, it is desirable that the storage devices have high access performance in order to perform the overwriting with initialization data at high speed. Therefore, the service C1, which adopts the second data-erasion mode, uses storage devices having the lowest access speed. On the other hand, the service B1, which adopts the first data-erasion mode, uses storage devices having higher access speed than the storage devices used in the service C1. In addition, since the second data-erasion mode is more advantageous to the service provider than the first data-erasion mode in that each logical volume the use of which is completed immediately becomes reusable in the second data-erasion mode, the usage fee for the service C1 is set lower than the service B1. Further, since the data erasion is doubly performed by the change of the encryption key and the overwriting with initialization data in the third data-erasion mode, the third data-erasion mode can be considered to be advantageous to the customers. Therefore, in the service correspondence table 461, the usage fee for the service A1 (which adopts the third data-erasion mode) is set higher than the services B1 and C1 (which respectively adopt the first and second data-erasion modes). Furthermore, since the overwriting with initialization data is performed in the service A1, it is desirable that the service A1 use storage devices having higher access performance than the service C1 (in which the overwriting with initialization data is not performed). Thus, the service correspondence table 461 is generated in such a manner that the service A1 uses storage devices having the highest access speed.

Incidentally, in the first data-erasion mode, the overwriting with initialization data is performed immediately after the use of a virtual disk is completed, the influence of the processing burden of the overwriting on the I/O processing in response to a request from the host server 200 in the first data-erasion mode is great. In this regard, the first data-erasion mode is disadvantageous to the service provider. From this viewpoint, the usage fee for the service which adopts the first data-erasion mode may be set higher than the service which adopts the third data-erasion mode. In addition, in the first data-erasion mode, it is possible to reduce the influence of the processing burden of the overwriting on the I/O processing, by increasing the access performance of the storage devices in use. From this viewpoint, storage devices having higher access speed may be used in the service which adopts the first data-erasion mode than in the service which adopts the third data-erasion mode.

On the other hand, as indicated in FIG. 13B, in the set of services indicated in the service correspondence table 462, the service A2 adopts the first data-erasion mode, the service B2 adopts the second data-erasion mode, and the service C2 adopts the third data-erasion mode. In the example using the service correspondence table 462, the operation of changing the encryption key is assumed not to be performed, in addition to the operation of overwriting with the initialization data, in the data-erasion processing in the third data-erasion mode adopted in the service C2. That is, in the third data-erasion mode adopted in the service C2, the overwriting with initialization data is performed asynchronously with the timing at which the use of the virtual disk is completed. Therefore, from the viewpoint of the customer satisfaction, the usage fee for the service A2 (which adopts the first data-erasion mode) is set higher than the service C2 (which adopts the third data-erasion mode) in the set of services indicated in the service correspondence table 462. In addition, in the third data-erasion mode in which the operation of changing the encryption key is not performed, there is a possibility that the original data is not erased before the overwriting with initialization data is completed. From this viewpoint, the usage fee for the service C2 (which adopts the third data-erasion mode) is set lower than the service B2 (which adopts the second data-erasion mode) in the set of services indicated in the service correspondence table 462. Further, since the overwriting with initialization data is performed immediately after the use of a virtual disk is completed in the first data-erasion mode, in order to complete the processing for the overwriting in a short time, it is desirable to use storage devices having high access performance in the first data-erasion mode. From this viewpoint, use of storage devices having higher access speed is indicated for the service A2 (which adopts the first data-erasion mode) than the service C2 (which adopts the third data-erasion mode) in the service correspondence table 462.

As explained above by using the exemplary service correspondence tables 461 and 462, it is desirable to choose an data-erasion mode according to the access performance of the used storage devices, the balance between advantages and disadvantages to the customers and the service provider, and other factors.

The service correspondence table (e.g., the service correspondence table 461 or 462) may be stored in a nonvolatile storage device provided in the infrastructure management server 400. In this case, when settings for construction of the virtual machines are made through the administrator terminal 500, the infrastructure management server 400 can refer to the service correspondence table, and present one or more available services to the administrator terminal 500. As illustrated in FIG. 13, in the case where preferable combinations of the performance attributes and the data-erasion modes are prepared in advance, it is possible to support the operation for selecting the performance attribute and the data-erasion mode, and facilitate the use of the services. In addition, the information processing system 100 may be configured to be able to directly present to the customers a set of services indicated in the service correspondence table.

Further, for example, when the infrastructure management server 400 receives from the administrator terminal 500 designation of a performance attribute of storage devices to be used for a virtual disk, the infrastructure management server 400 may refer to the service correspondence table, extract an appropriate one of the data-erasion modes for the designated performance attribute, and output to the administrator terminal 500 the extracted data-erasion mode as a recommended data-erasion mode. Alternatively, the infrastructure management server 400 may automatically set an appropriate one of the data-erasion modes for the performance attribute designated by the administrator terminal 500.

2.12 Flow of Data-Erasion Processing

Examples of flows of operations performed in the information processing system 100 are explained below.

2.12.1 Preprocessing

Figure 15:
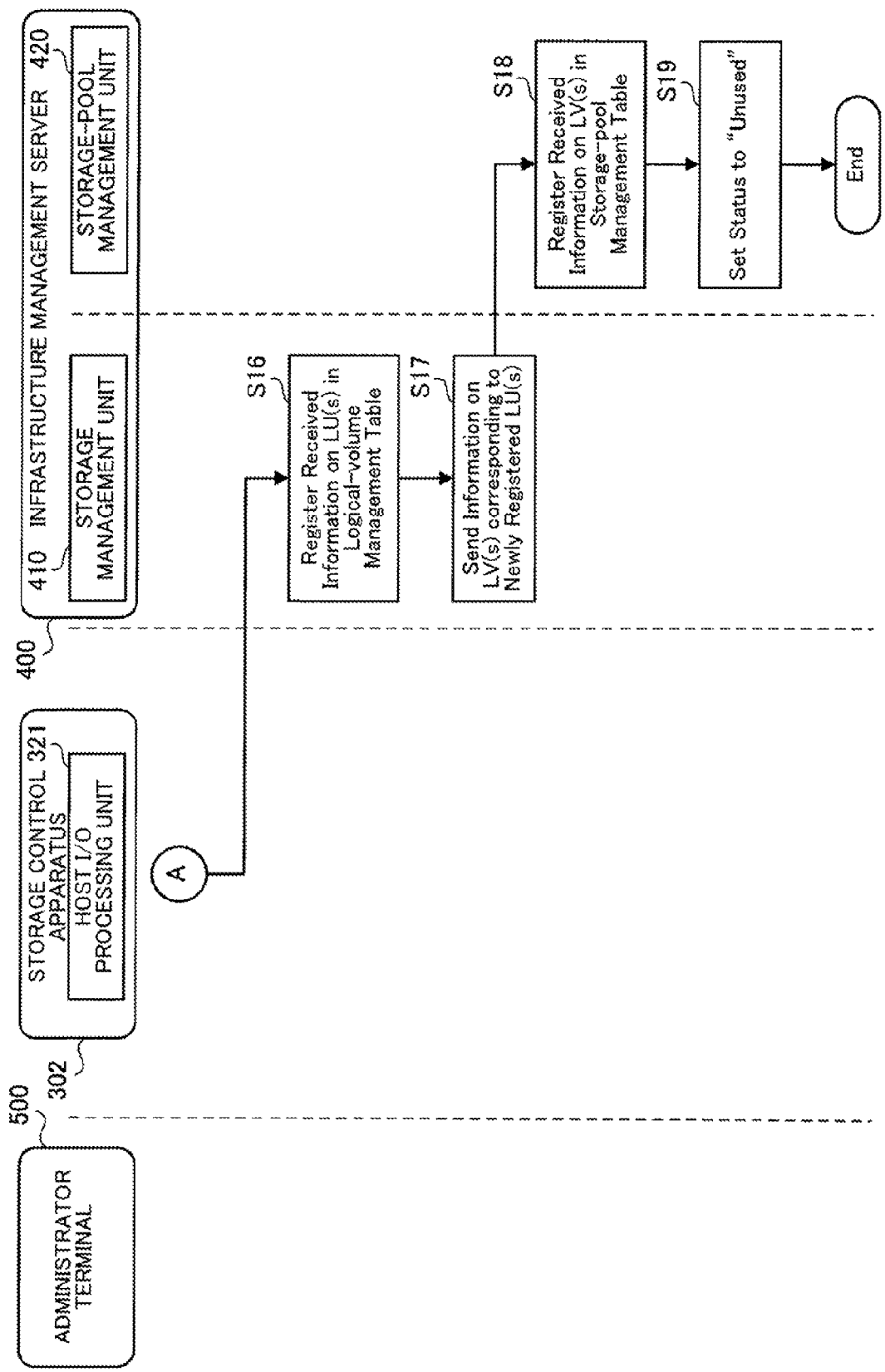

FIGS. 14 and 15 indicate an example of a flow of preprocessing for constructing virtual machines and virtual disks.

<Step S11> The administrator performs, through the administrator terminal 500, operations for generation and setting of logical units (LUs) needed for generation of virtual disks. Specifically, the administrator inputs into the administrator terminal 500 information on the logical units to be set (i.e., setting information for the logical units). Then, the administrator terminal 500 transmits the inputted setting information to the host I/O processing unit 321 in the storage control apparatus 302, and requests the host I/O processing unit 321 to generate the logical units.

<Step S12> The host I/O processing unit 321 receives the setting information from the administrator terminal 500, and constructs the logical units on the basis of the setting information. Specifically, the host I/O processing unit 321 extracts from the RAID management table 330 a record 331 for a RAID group designated by the administrator terminal 500. Then, the host I/O processing unit 321 constructs the logical units by setting in the extracted record 331 information on the logical units. In addition, the host I/O processing unit 321 generates in the encryption-key management table 340 a record for each of the constructed logical units.

<Step S13> The host I/O processing unit 321 determines, on the basis of the setting information received from the administrator terminal 500, whether or not data to be stored in each logical unit constructed in step S12 is to be encrypted. When the data is to be encrypted, i.e., when yes is determined in step S13, the operation goes to step S14. When the data is not to be encrypted, i.e., when no is determined in step S13, the operation goes to step S15.

<Step S14> The host I/O processing unit 321 generates a unique encryption key for each logical unit constructed in step S12, and registers the encryption key in the record generated in the encryption-key management table 340 in step S12.

<Step S15> The host I/O processing unit 321 sends to the storage management unit 410 in the infrastructure management server 400 information on the constructed logical units. The information on the constructed logical units includes, for example, identification numbers of the RAID group and the logical units, address information indicating the area in which each logical unit is located, the performance attribute of storage devices constituting each logical unit, and information indicating whether or not data to be stored in each logical unit is to be encrypted.

<Step S16> The storage management unit 410 in the infrastructure management server 400 registers in the logical-volume management table 430 the identification numbers of the RAID group and the logical units, which are sent from the host I/O processing unit 321. By the registration of the identification numbers, the logical units, which are managed by the storage control apparatus 302, are respectively associated with logical volumes registered in the storage pool 303.

<Step S17> The storage management unit 410 informs the storage-pool management unit 420 of identification numbers of the logical volumes associated with the newly registered logical units. At this time, the storage management unit 410 sends to the storage-pool management unit 420, for example, the performance attribute of the storage devices constituting each logical unit and the information indicating whether or not data to be stored in each logical unit is to be encrypted.

<Step S18> The storage-pool management unit 420 registers in the storage-pool management tables 440 the identification numbers of the logical volumes of which the storage-pool management unit 420 is informed by the storage management unit 410. In the case where the storage-pool management tables 440 are individually provided for the respective performance attributes of the storage devices realizing the logical units corresponding to the logical volumes and the respective cases where stored data is encrypted and is not encrypted, the storage-pool management unit 420 may register the identification number of each of the logical volumes in a corresponding one of the storage-pool management tables 440.

<Step S19> The storage-pool management unit 420 sets the status "Unused" in every record which is newly registered in step S18 in the storage-pool management tables 440. Thus, registration of the logical volumes in the storage pool 303 is completed.

2.12.2 Operations Performed when Virtual Machine is Constructed

Figure 16:
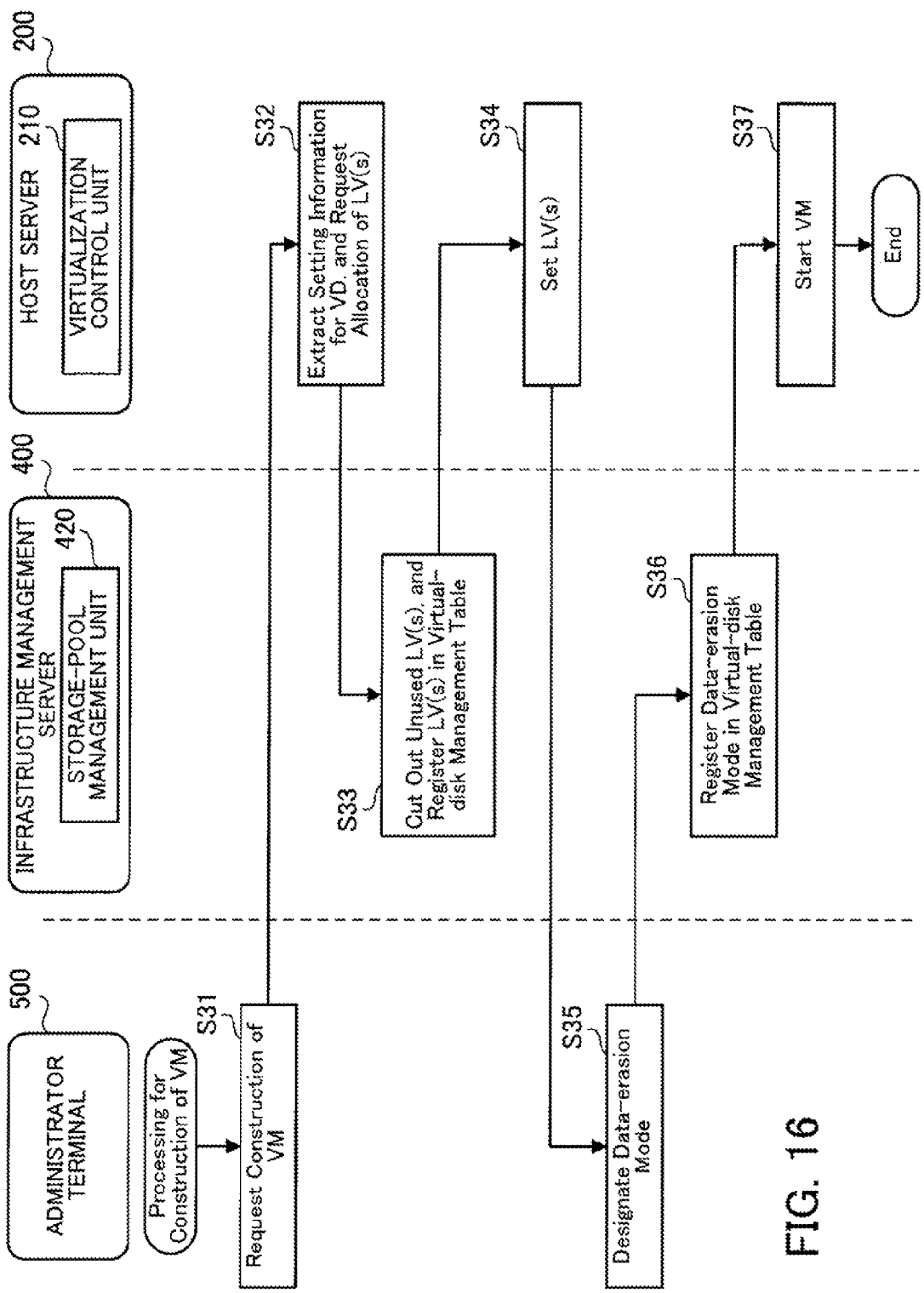
FIG. 16 indicates an example of a flow of operations performed when a virtual machine is constructed.

FIG. 16 indicates an example of a flow of operations when a virtual machine is constructed.

<Step S31> The administrator makes settings for constructing a virtual machine (VM), through the administrator terminal 500. Specifically, the administrator inputs into the administrator terminal 500 information on the performance of the CPU and the memory capacity in the virtual machine, setting information for a virtual disk (VD), and other information. The setting information for the virtual disk includes, for example, the storage capacity of the virtual disk, the performance attribute of the virtual disk, and information indicating whether to encrypt data to be stored in the virtual disk. The administrator terminal 500 transmits the inputted information to the virtualization control unit 210 in the host server 200, and requests the virtualization control unit 210 to construct the virtual machine.

<Step S32> The virtualization control unit 210 in the host server 200 receives the information transmitted from the administrator terminal 500, and constructs the virtual machine on the basis of the received information. In addition, the virtualization control unit 210 transmits the setting information for the virtual disk and the identification information for the virtual machine and the virtual disk to the storage-pool management unit 420 in the infrastructure management server 400, and requests the storage-pool management unit 420 to allocate logical volumes for the virtual disk.

<Step S33> The storage-pool management unit 420 in the infrastructure management server 400 receives the above information from the virtualization control unit 210, cuts out unused logical volumes from the storage pool 303, and allocates the logical volumes for the virtual disk. Specifically, the storage-pool management unit 420 refers to one of the storage-pool management tables 440 corresponding to the performance attribute and the information as to whether or not the data to be stored in the virtual disk is to be encrypted, which are included in the information transmitted from the virtualization control unit 210 to the storage-pool management unit 420. Then, the storage-pool management unit 420 selects unused logical volumes for the storage capacity of the virtual disk, from among logical volumes the status of which are indicated as "Unused" in the corresponding storage-pool management table 440, and updates the status of the selected logical volumes in the corresponding storage-pool management table 440 to "Currently Used". In addition, the storage-pool management unit 420 registers the identification numbers of the logical volumes allocated for the virtual disk, in the record in the virtual-disk management table 450 for the virtual machine which is being constructed. When the above operations are completed, the storage-pool management unit 420 transmits the identification numbers of the logical volumes allocated for the virtual disk to the virtualization control unit 210 in the host server 200.

<Step S34> The virtualization control unit 210 in the host server 200 receives the identification numbers of the logical volumes from the storage-pool management unit 420, and registers the received identification numbers in the virtual-disk management table 220, and makes settings for the logical volumes. In addition, the virtualization control unit 210 also registers in the virtual-disk management table 220 information on the logical units corresponding to the logical volumes allocated for the virtual disk. The information on the logical units may be acquired, for example, by inquiring from the storage control apparatus 302 or the storage management unit 410 in the infrastructure management server 400. Alternatively, in step S33, the storage management unit 410 may transmit the information on the logical units through the storage-pool management unit 420 to the virtualization control unit 210. When the setting for the virtual disk is completed, the virtualization control unit 210 informs the administrator terminal 500 of the completion of the setting.

In the above operations, it is assumed that the storage-pool management unit 420 in the infrastructure management server 400 allocates the logical volumes for the virtual disk. Alternatively, the virtualization control unit 210 in the host server 200, instead of the storage-pool management unit 420, may allocate the logical volumes for the virtual disk. In this case, the host server 200 also holds the information indicated in the storage-pool management tables 440 and the logical-volume management table 430. The virtualization control unit 210 transmits the identification numbers of the logical volumes allocated for the virtual disk by the virtualization control unit 210, to the storage-pool management unit 420 in the infrastructure management server 400. Then, the storage-pool management unit 420 receives the identification numbers from the virtualization control unit 210, and registers the received identification numbers in the storage-pool management tables 440 and the logical-volume management table 430.

<Step S35> The administrator terminal 500 receives an input for selection of the data-erasion mode by the administrator. The administrator terminal 500 informs the storage-pool management unit 420 in the infrastructure management server 400 of the selected data-erasion mode.

<Step S36> The storage-pool management unit 420 in the infrastructure management server 400 registers the data-erasion mode (of which the storage-pool management unit 420 is informed by the administrator terminal 500) in the record in the virtual-disk management table 450 for the virtual machine which is being constructed. When the registration is completed, the storage-pool management unit 420 informs the virtualization control unit 210 in the host server 200 of the completion of the setting for the virtual disk.

<Step S37> The virtualization control unit 210 in the host server 200 starts the constructed virtual machine. That is, the use of the virtual machine is started.

Further, before the data-erasion mode is designated, the administrator terminal 500 may be informed of a recommended data-erasion mode on the basis of the service correspondence tables 461 and 462. The informing of the recommended data-erasion mode can be realized by modifying the sequence of FIG. 16 as indicated in FIG. 17.

Figure 17:
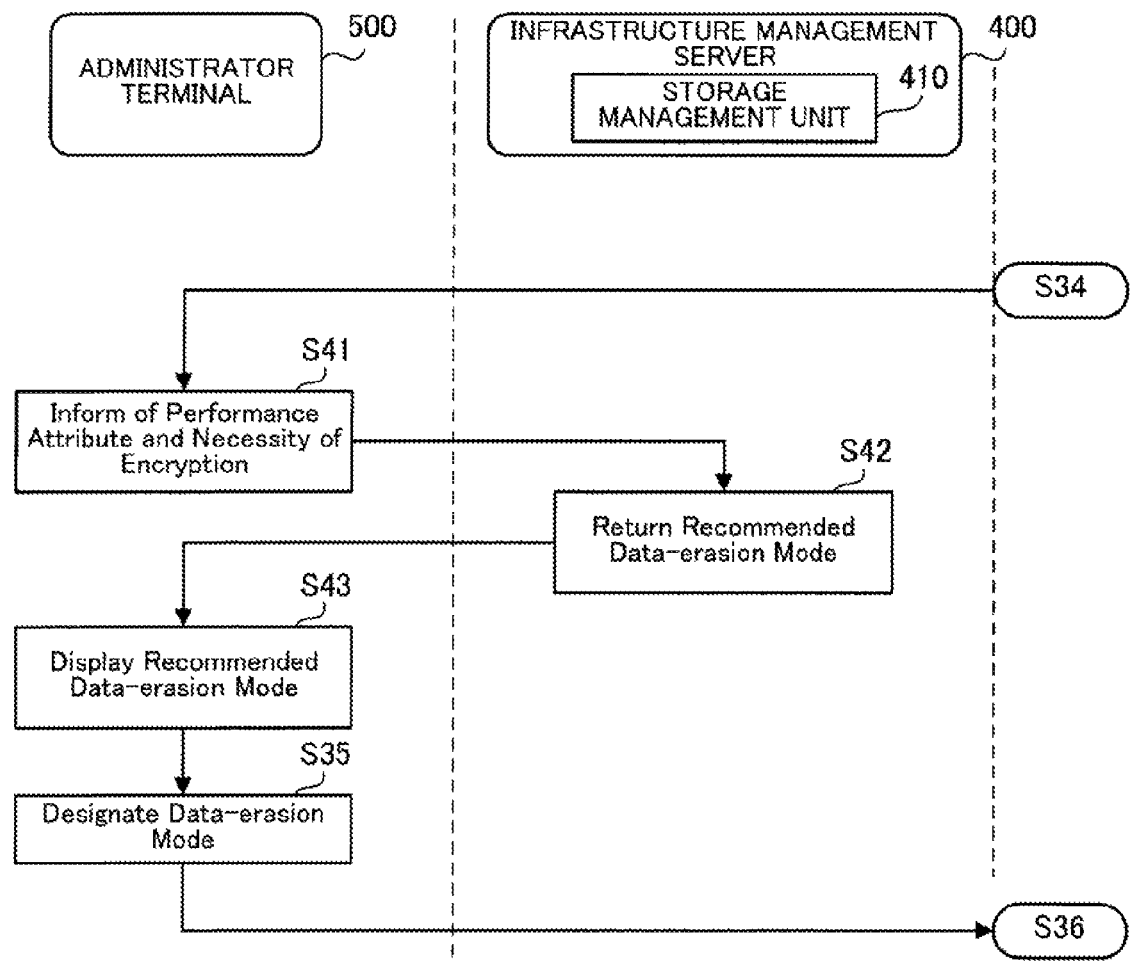
FIG. 17 indicates an example of a modification of the flow of FIG. 16 in which a recommended data-erasion mode is presented to an administrator.

FIG. 17 indicates an example of a modification of the flow of FIG. 16 in which a recommended data-erasion mode is presented to the administrator. In FIG. 17, the same steps as in FIG. 16 are indicated by the same step numbers as FIG. 16.

<Step S41> After the operations in step S34 explained with reference to FIG. 16 are performed, the administrator terminal 500 receives from the virtualization control unit 210 in the host server 200 the performance attribute of the storage devices allocated for the virtual disk and the information indicating whether or not data to be stored in the virtual disk is to be encrypted. The administrator terminal 500 transmits the above information received from the virtualization control unit 210, to the storage management unit 410 in the infrastructure management server 400, and inquires a recommended data-erasion mode from the storage management unit 410.

<Step S42> The storage management unit 410 in the infrastructure management server 400 determines a data-erasion mode appropriate for the information received from the administrator terminal 500, on the basis of the service correspondence table 461 or 462. Then, the storage management unit 410 transmits to the administrator terminal 500 the determined data-erasion mode and the corresponding usage fee.

<Step S43> The administrator terminal 500 makes a display device display recommendations of the data-erasion mode and the usage fee. Thus, the administrator can refer to the information displayed on the display device, and manipulate the administrator terminal 500 for selecting the data-erasion mode in step S35.

The above operations can support the administrator's operation for selection of the data-erasion mode. Alternatively, for example, the storage management unit 410 may automatically set the data-erasion mode by informing the storage-pool management unit 420 of the data-erasion mode appropriate for the information received from the administrator terminal 500 after the appropriate data-erasion mode is determined in step S42.

2.12.3 Operations Performed when Host Server Accesses Virtual Disk

Figure 18:
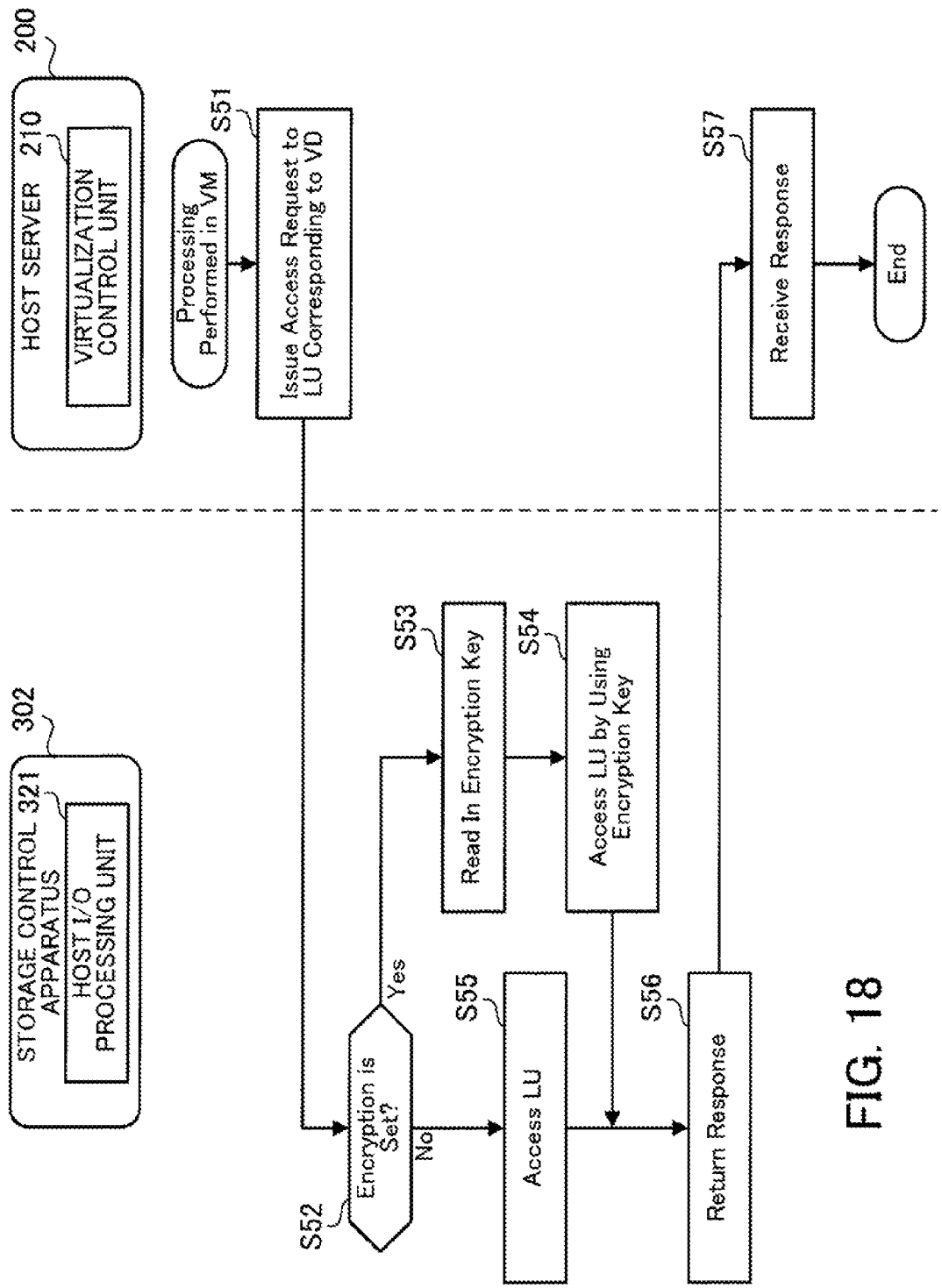
FIG. 18 indicates an example of a flow of operations performed when the host server accesses a virtual disk.
Figure 19:
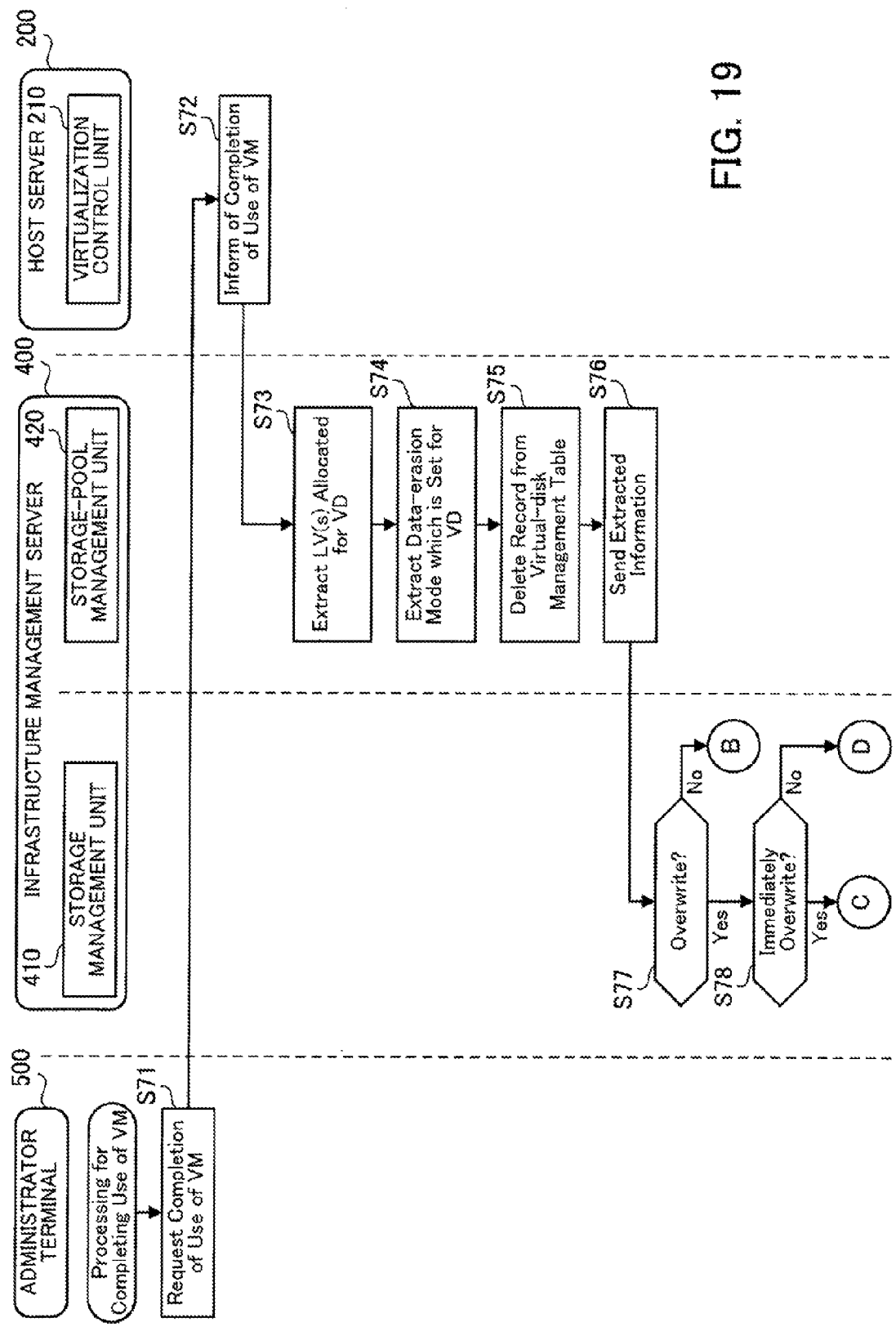
FIGS. 19, 20, 21, 22, and 23 indicate an example of a flow of operations performed when use of a virtual disk is completed.

FIG. 18 indicates an example of a flow of operations performed when the host server 200 accesses a virtual disk.

<Step S51> After use of a virtual machine is started, the virtualization control unit 210 in the host server 200 receives, from a terminal (not shown) operated by a user, a request for access to the virtual disk. The virtualization control unit 210 transforms an address which is to be accessed and is received from the user's terminal, into an address in the logical units (i.e., the identification numbers of the RAID group and a logical unit and the LBA) by reference to the virtual-disk management table 220, and issues an access request designating the transformed address as an address to be accessed, to the host I/O processing unit 321 in the storage control unit 320.

<Step S52> When the host I/O processing unit 321 in the storage control unit 320 receives the access request, the host I/O processing unit 321 determines whether or not the logical unit to be accessed is set to encrypt data before the data is stored in logical unit. Specifically, the host I/O processing unit 321 refers to the encryption-key management table 340. When an encryption key is set in the encryption-key management table 340 for the logical unit to be accessed, the host I/O processing unit 321 determines that the logical unit to be accessed is set to encrypt data before the data is stored in logical unit. Alternatively, the host I/O processing unit 321 refers to the record 331 in the RAID management table 330 for the RAID group to be accessed, and determines, on the basis of the information item "Encryption Setting" in the record 331, whether or not the logical unit to be accessed is set to encrypt data before the data is stored in logical unit.

When the logical unit to be accessed is set to encrypt data before the data is stored in logical unit, i.e., when yes is determined in step S52, the operation goes to step S53. When the logical unit to be accessed is set not to encrypt data before the data is stored in logical unit, i.e., when no is determined in step S52, the operation goes to step S55.

<Step S53> The host I/O processing unit 321 reads from the encryption-key management table 340 the encryption key which is set for the logical unit to be accessed.

<Step S54> The host I/O processing unit 321 performs processing for the requested access by using the encryption key which is read from the encryption-key management table 340. For example, in the case where the host I/O processing unit 321 is requested to read out data, the host I/O processing unit 321 reads encrypted data from the accessed position, and decrypts the encrypted data by using the encryption key which is read from the encryption-key management table 340. In the case where the host I/O processing unit 321 is requested to write data, the host I/O processing unit 321 encrypts data which is received from the virtualization control unit 210 and is to be written, by using the encryption key which is read from the encryption-key management table 340, and then the host I/O processing unit 321 writes the encrypted data in the accessed position.

<Step S55> The host I/O processing unit 321 performs processing for the requested access without using encryption or decryption.

<Step S56> The host I/O processing unit 321 returns to the virtualization control unit 210 in the host server 200 a response indicating completion of the requested access. In the case where the host I/O processing unit 321 is requested to read out data, the host I/O processing unit 321 transmits to the virtualization control unit 210 the data which is read out from the accessed position (and decrypted when necessary).

<Step S57> The virtualization control unit 210 in the host server 200 receives the response from the host I/O processing unit 321, and returns a response to the user's terminal.

2.12.4 Operations Performed when Use of Virtual Disk is Completed

FIGS. 19, 20, 21, 22, and 23 indicate an example of a flow of operations performed when use of a virtual disk is completed.

<Step S71> In response to a manipulation by the administrator for input, the administrator terminal 500 informs the virtualization control unit 210 in the host server 200 of the identification number of a virtual machine, and requests the virtualization control unit 210 to complete use of the virtual machine.

<Step S72> When the virtualization control unit 210 in the host server 200 receives the request for completion of the use of the virtual machine, the virtualization control unit 210 stops the use of the virtual machine. At this time, the virtualization control unit 210 deletes from the virtual-disk management table 220 information on a virtual disk corresponding to the virtual machine. In addition, the virtualization control unit 210 informs the storage-pool management unit 420 in the infrastructure management server 400 of the identification number of the virtual machine the use of which is completed.

<Step S73> The storage-pool management unit 420 in the infrastructure management server 400 determines the virtual disk corresponding to the virtual machine (the use of which is completed) by reference to the virtual-disk management table 450, and extracts from the virtual-disk management table 450 logical volumes allocated for the determined virtual disk. (Hereinafter, the virtual disk corresponding to the virtual machine the use of which is completed is referred to as the virtual disk the use of which is completed.)

<Step S74> The storage-pool management unit 420 extracts from the virtual-disk management table 450 a data-erasion mode which is set for the virtual disk the use of which is completed. Alternatively, the operation in step S74 may be performed before the operations in step S73.

<Step S75> The storage-pool management unit 420 deletes from the virtual-disk management table 450 the record for the virtual machine the use of which is completed (which is referred to in steps S73 and S74).

<Step S76> The storage-pool management unit 420 sends to the storage management unit 410 the identification number of the virtual disk the use of which is completed and the information extracted in step S73 and S74. Alternatively, the operation in step S76 may be performed before the operations in step S75.

<Step S77> The storage management unit 410 in the infrastructure management server 400 determines whether to perform overwriting with initialization data, on the basis of the data-erasion mode of which the storage management unit 410 is informed by the storage-pool management unit 420. In the case where the data-erasion mode is the first or third data-erasion mode, the overwriting with initialization data is determined to be performed (i.e., yes is determined in step S77). In this case, the operation goes to step S78. In the case where the data-erasion mode is the second data-erasion mode, the overwriting with initialization data is determined not to be performed (i.e., no is determined in step S77). In this case, the operation goes to step S86 (in FIG. 21).

Figure 20:
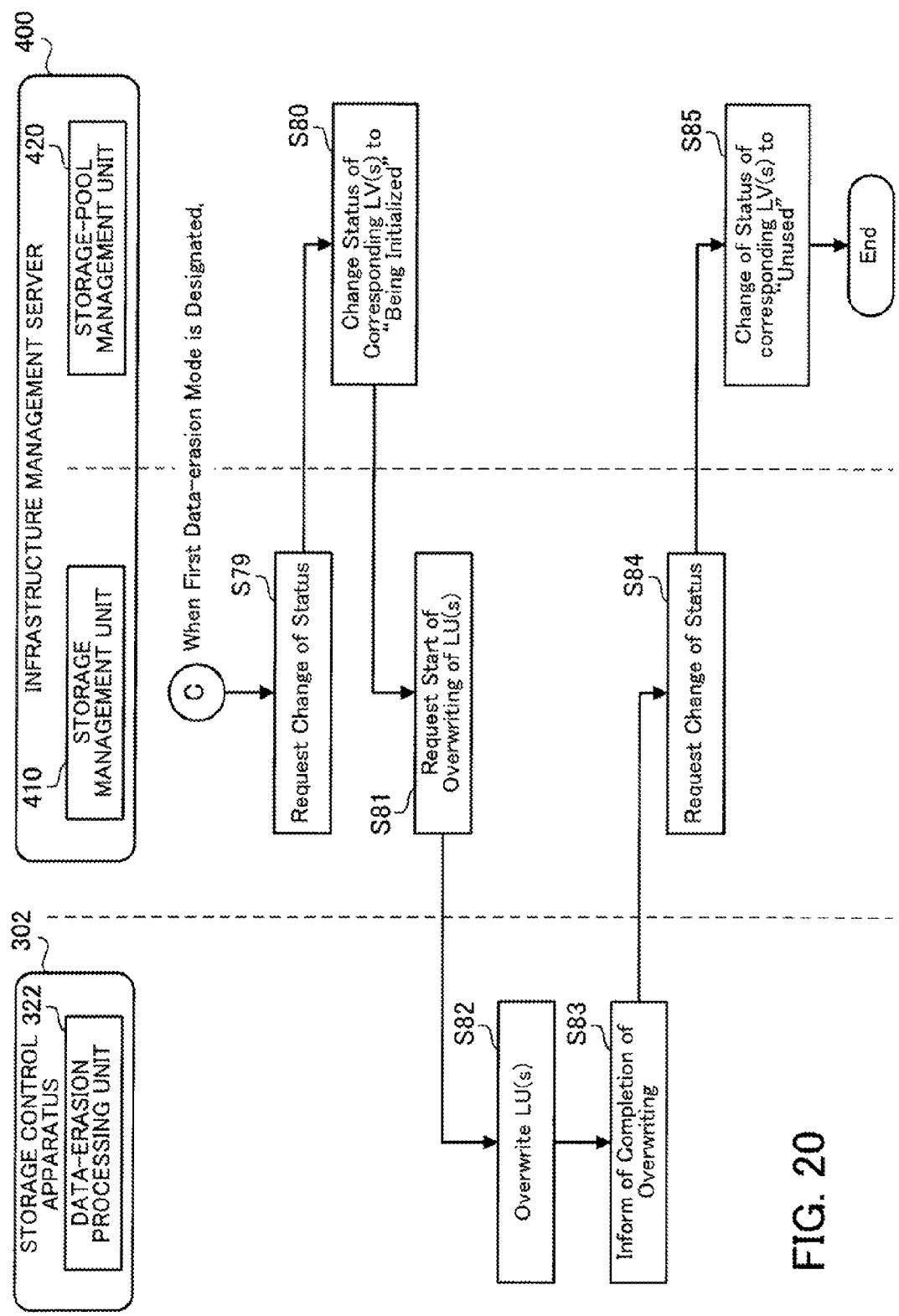
Figure 21:
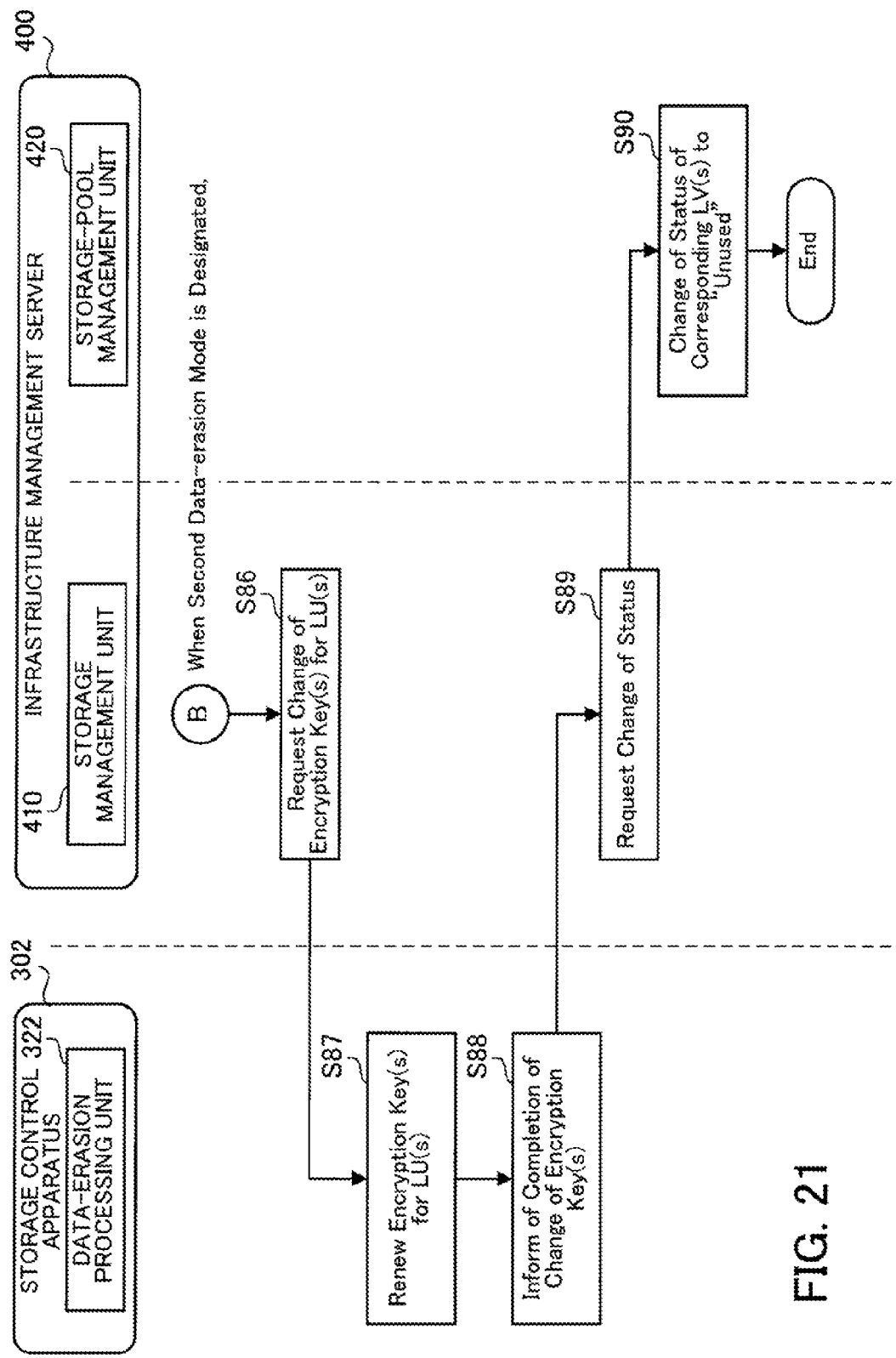
Figure 22:
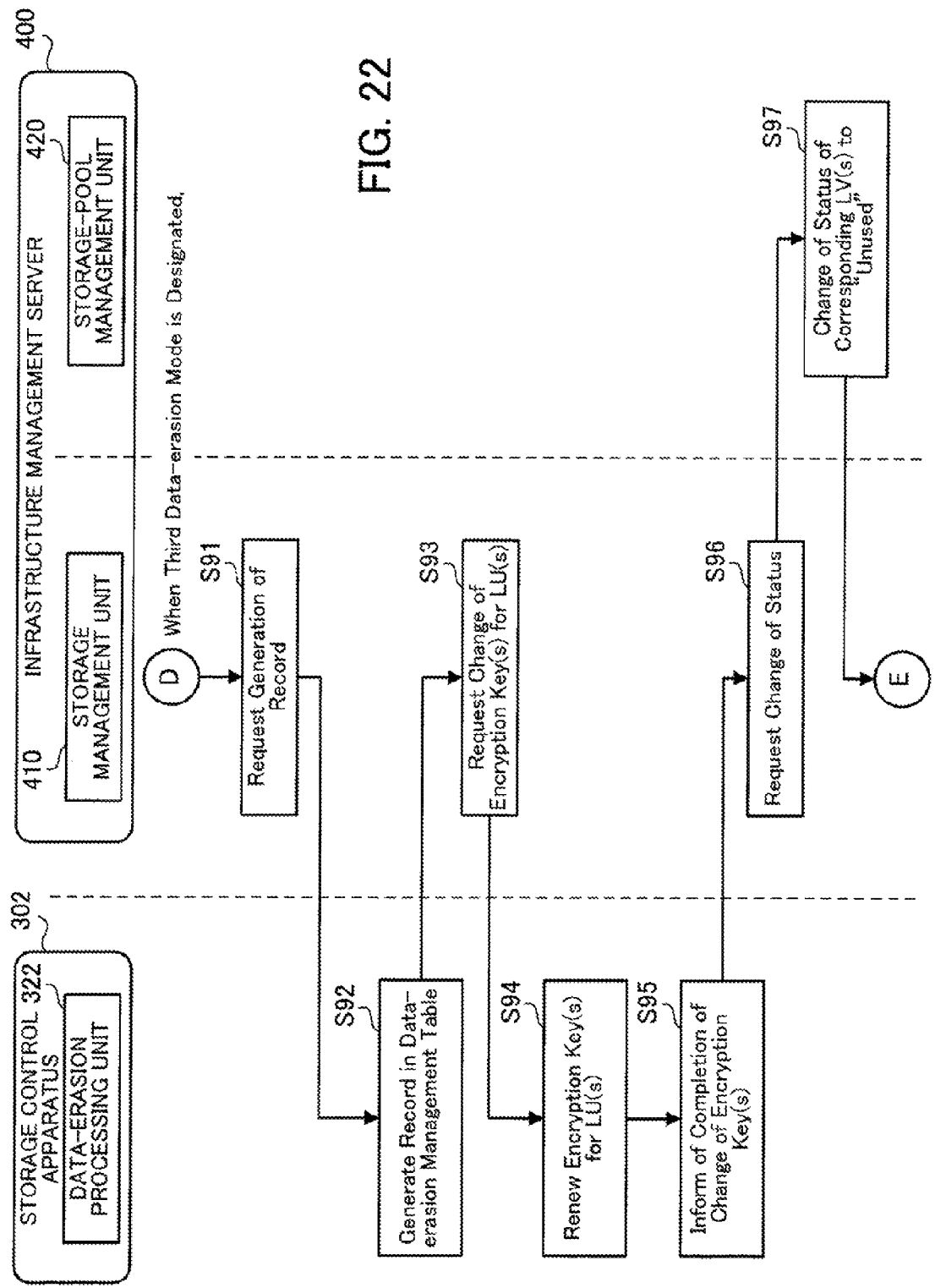
Figure 23:
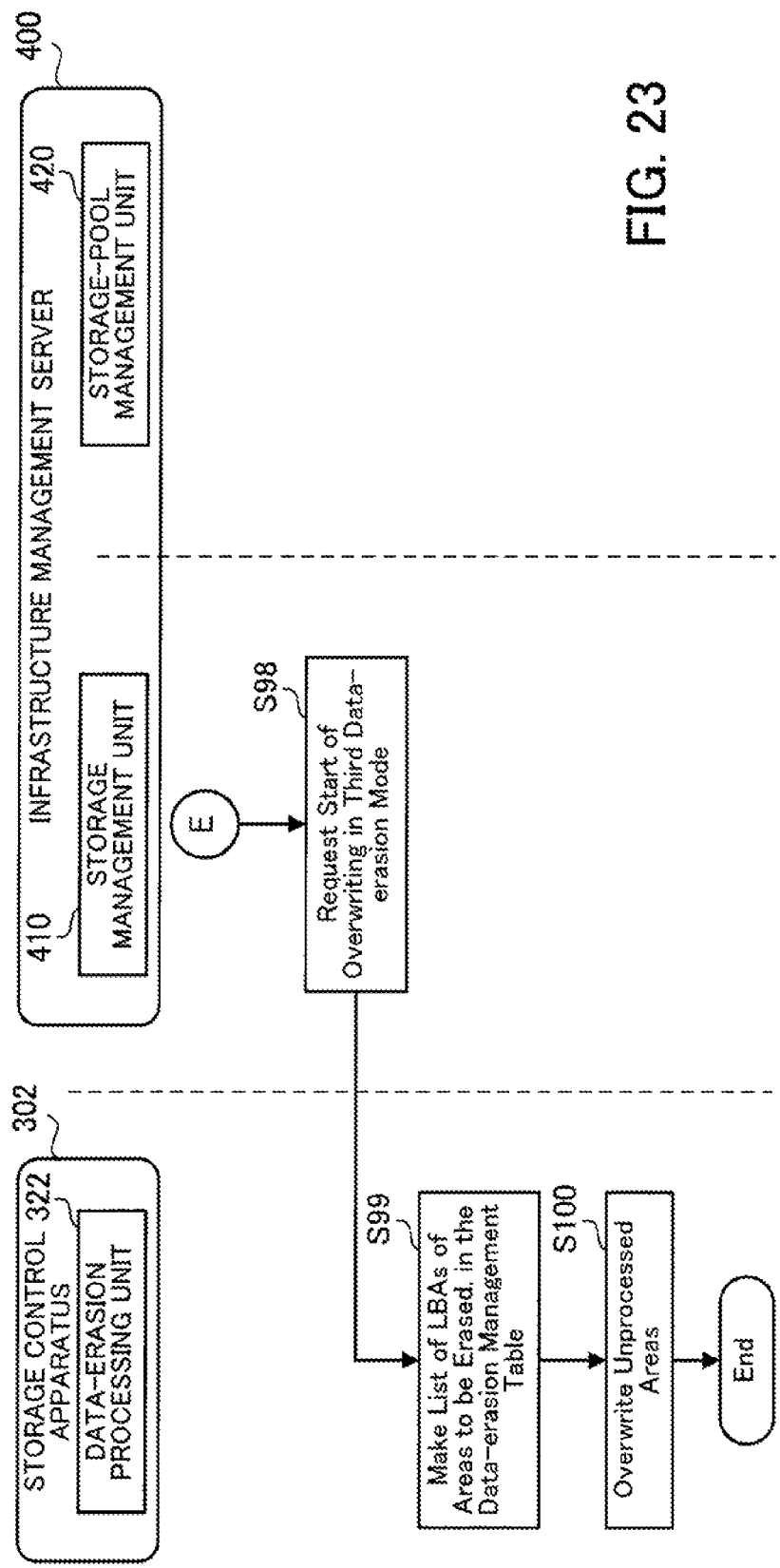

<Step S78> In the case where the data-erasion mode is the first data-erasion mode, the overwriting with initialization data is determined to be immediately performed (i.e., yes is determined in step S78), and the operation goes to step S79 (in FIG. 20). In the case where the data-erasion mode is the third data-erasion mode, the overwriting with initialization data is determined not to be immediately performed (i.e., no is determined in step S78), and the operation goes to step S91 (in FIG. 22).

<Step S79> Since the data-erasion mode is the first data-erasion mode (i.e., yes is determined in step S78), the storage management unit 410 informs the storage-pool management unit 420 of the identification numbers of the logical volumes allocated for the virtual disk the use of which is completed, and requests the storage-pool management unit 420 to change the status of the logical volumes informed by the storage management unit 410 to "Being Initialized" in the storage-pool management tables 440.

<Step S80> When the storage-pool management unit 420 receives the request for change of the status of the logical volumes, the storage-pool management unit 420 changes the status of the logical volumes from "Being Used" to "Being Initialized" in the storage-pool management tables 440. When the change of the status is completed, the storage-pool management unit 420 informs the storage management unit 410 of the completion of the status change.

<Step S81> The storage management unit 410 determines the logical units corresponding to the logical volumes allocated for the virtual disk the use of which is completed, by reference to the logical-volume management table 430. Then, the storage management unit 410 informs the data-erasion processing unit 322 in the storage control apparatus 302 of the identification numbers of the determined logical units, and requests the data-erasion processing unit 322 to start processing for overwriting the logical units in the first data-erasion mode.

<Step S82> The data-erasion processing unit 322 in the storage control apparatus 302 starts the processing for overwriting the above logical units with initialization data. In the case where one or more other virtual machines are in operation at this time, processing for access to other virtual disks for the other virtual machines in operation is performed by the host I/O processing unit 321 in response to a request from the host server 200, in parallel with the processing performed by the data-erasion processing unit 322 for overwriting, with the initialization data, of the logical units of which the data-erasion processing unit 322 is informed by the storage management unit 410. (The above processing performed by the host I/O processing unit 321 for access to virtual disks is hereinafter referred to as the host-access processing.)

<Step S83> When the processing for overwriting, with the initialization data, of all the logical units of which the data-erasion processing unit 322 is informed by the storage management unit 410 is completed, the data-erasion processing unit 322 informs the storage management unit 410 in the infrastructure management server 400 of the completion of the processing for overwriting.

<Step S84> The storage management unit 410 in the infrastructure management server 400 requests the storage-pool management unit 420 to change the status of the logical volumes allocated for the virtual disk the use of which is completed, to "Unused".

<Step S85> The storage-pool management unit 420 changes the status of the logical volumes allocated for the virtual disk the use of which is completed, from "Being Initialized" to "Unused" in the storage-pool management tables 440. Thus, the processing for completing the use of the virtual disk is completed, so that the logical volumes which have been allocated for the virtual disk become reusable logical volumes for other virtual disks.

In the case where the information processing system 100 is configured in such a manner that the virtualization control unit 210 in the host server 200 allocates logical volumes for each virtual disk, for example, after the change of status in step S85, the storage-pool management unit 420 informs the virtualization control unit 210 of the identification numbers of the logical volumes the status of which is changed. Then, the virtualization control unit 210 releases the above logical volumes from the virtual disk, so that the processing for completion of the use of the virtual disk is completed.

<Step S86> In the case where the data-erasion mode is the second data-erasion mode (i.e., when no is determined in step S77), the storage management unit 410 determines logical units corresponding to the logical volumes allocated for the virtual disk the use of which is completed, by reference to the logical-volume management table 430. Then, the storage management unit 410 informs the data-erasion processing unit 322 in the storage control apparatus 302 of the identification numbers of the determined logical units, and requests the data-erasion processing unit 322 to change the encryption keys used in access to the logical units.

<Step S87> The data-erasion processing unit 322 in the storage control apparatus 302 makes the host I/O processing unit 321 newly generate a unique encryption key for each of the logical units of which the data-erasion processing unit 322 is informed by the storage management unit 410, and substitutes the encryption key which has been set for each of the logical units in the encryption-key management table 340 with the newly generated encryption key.

<Step S88> When the data-erasion processing unit 322 completes the change of the encryption keys for all the logical units of which the data-erasion processing unit 322 is informed by the storage management unit 410, the data-erasion processing unit 322 informs the storage management unit 410 of the completion of the change of the encryption keys.

<Step S89> The storage management unit 410 in the infrastructure management server 400 requests the storage-pool management unit 420 to change the status of the logical volumes allocated for the virtual disk the use of which is completed, to "Unused".

<Step S90> The storage-pool management unit 420 changes the status of the logical volumes allocated for the virtual disk the use of which is completed, from "Being Used" to "Unused" in the storage-pool management tables 440. Thus, the processing for completing the use of the virtual disk is completed, so that the logical volumes which have been allocated for the virtual disk become reusable logical volumes for other virtual disks.

In the case where the information processing system 100 is configured in such a manner that the virtualization control unit 210 in the host server 200 allocates logical volumes for each virtual disk, for example, after the change of status in step S90, the storage-pool management unit 420 informs the virtualization control unit 210 of the identification numbers of the logical volumes the status of which is changed. Then, the virtualization control unit 210 releases the above logical volumes from the virtual disk, so that the processing for completion of the use of the virtual disk is completed.

In the above operations in steps S86 to S90 in which data are erased in the second data-erasion mode, the logical volumes allocated for the virtual disk the use of which is completed are released from the virtual disk by merely changing the encryption key used in the logical units corresponding to the logical volumes, so that the released logical volumes become reusable for other virtual disks. Therefore, the operations in steps S86 to S90 for data erasion adopting the second data-erasion mode can make the logical volumes transition to a state in which the logical volumes can be reused for other virtual disks in a shorter time than the operations in steps S79 to S85 for data erasion adopting the first data-erasion mode, so that the operations in steps S86 to S90 enable more efficient use of logical volumes than the operations in steps S79 to S85.

<Step S91> In the case where the data-erasion mode is the third data-erasion mode (i.e., when no is determined in step S78), the storage management unit 410 informs the data-erasion processing unit 322 in the storage control apparatus 302 of the identification numbers of the virtual machine and the virtual disk the use of which is completed, and requests the data-erasion processing unit 322 to generate a new record in the data-erasion management table 350.

<Step S92> The data-erasion processing unit 322 in the storage control apparatus 302 generates a record in the data-erasion management table 350 for the virtual machine and the virtual disk of which the data-erasion processing unit 322 is informed by the storage management unit 410. When the generation of the record is completed, the data-erasion processing unit 322 informs the storage management unit 410 in the infrastructure management server 400 of the completion of the generation of the record.

<Step S93> The storage management unit 410 determines the logical units corresponding to the logical volumes allocated for the virtual disk the use of which is completed, by reference to the logical-volume management table 430. The storage management unit 410 informs the data-erasion processing unit 322 in the storage control apparatus 302 of the identification numbers of the determined logical units, and requests the data-erasion processing unit 322 to change the encryption key used in access to the logical units.

<Step S94> The data-erasion processing unit 322 in the storage control apparatus 302 makes the host I/O processing unit 321 newly generate a unique encryption key for each of the logical units of which the data-erasion processing unit 322 is informed by the storage management unit 410, and substitutes the encryption key which has been set for each of the logical units in the encryption-key management table 340 with the newly generated encryption key.

<Step S95> When the data-erasion processing unit 322 completes the change of the encryption keys for all the logical units of which the data-erasion processing unit 322 is informed by the storage management unit 410, the data-erasion processing unit 322 informs the storage management unit 410 of the completion of the change of the encryption keys.

<Step S96> The storage management unit 410 in the infrastructure management server 400 requests the storage-pool management unit 420 to change the status of the logical volumes allocated for the virtual disk the use of which is completed, to "Unused".

<Step S97> The storage-pool management unit 420 changes the status of the logical volumes allocated for the virtual disk the use of which is completed, from "Being Used" to "Unused" in the storage-pool management tables 440. Thus, the processing for completing the use of the virtual disk is completed, so that the logical volumes which have been allocated for the virtual disk become reusable logical volumes for other virtual disks. When the change of the status is completed, the storage-pool management unit 420 informs the storage management unit 410 of the completion of the status change.

In the case where the information processing system 100 is configured in such a manner that the virtualization control unit 210 in the host server 200 allocates logical volumes for each virtual disk, for example, after the change of status in step S97, the storage-pool management unit 420 informs the virtualization control unit 210 of the identification numbers of the logical volumes the status of which is changed. Then, the virtualization control unit 210 releases the above logical volumes from the virtual disk, so that the processing for completion of the use of the virtual disk is completed.

<Step S98> The storage management unit 410 informs the data-erasion processing unit 322 in the storage control apparatus 302 of the identification numbers of the logical units determined in step S93, and requests the data-erasion processing unit 322 to start processing for overwriting the logical units in the third data-erasion mode.

<Step S99> The data-erasion processing unit 322 in the storage control apparatus 302 registers the logical units of which the data-erasion processing unit 322 is informed by the storage management unit 410, in the record generated in the data-erasion management table 350 in step S92, and makes a list of the leading LBAs of the unit areas constituting each of the logical units in the data-erasion management table 350. Thus, the addresses of the entire areas in which stored data are to be erased in the third data-erasion mode are registered in the data-erasion management table 350. In addition, the operational status of every unit area the leading LBA of which is listed in the data-erasion management table 350 are set to "Unprocessed" at this time.

<Step S100> The data-erasion processing unit 322 performs an operation of overwriting each unit area for which the operational status "Unprocessed" is set in the data-erasion management table 350, with initialization data. At this time, because of the change of the status to "Unused" in the storage-pool management tables 440 in step S97, the logical volumes which have been allocated for the virtual disk the use of which is completed are already reusable for other virtual disks. Therefore, part of the logical units (of which the data-erasion processing unit 322 is informed in step S98) can be allocated for other virtual disks and data can be written in the part of the logical units in response to one or more requests from the host server 200 before the part of the logical units are overwritten with the initialization data. When data are written in part of the unit areas registered in the data-erasion management table 350 in response to one or more requests from the host server 200, the operational status of the part of the unit areas are updated to "Overwritten" in the data-erasion management table 350.

2.12.5 Host-Access Processing and Processing for Overwriting

The operation of overwriting in the third data-erasion mode is performed when the aforementioned host-access processing is not performed, as explained below with reference to FIGS. 24 and 25. In the operations in step S91 to S100 (in FIGS. 22 and 23) which are performed in the case where the third data-erasion mode is set, similarly to the case where the second data-erasion mode is set, the logical volumes which have been allocated for the virtual disk the use of which is completed are released and become reusable for other virtual disks immediately after the encryption key is changed. Thereafter, when the aforementioned host-access processing is not performed, the operation of overwriting with the initialization data is performed on only part of the unit areas for which the operational status "Unprocessed" is set in the data-erasion management table 350.

Figure 24:
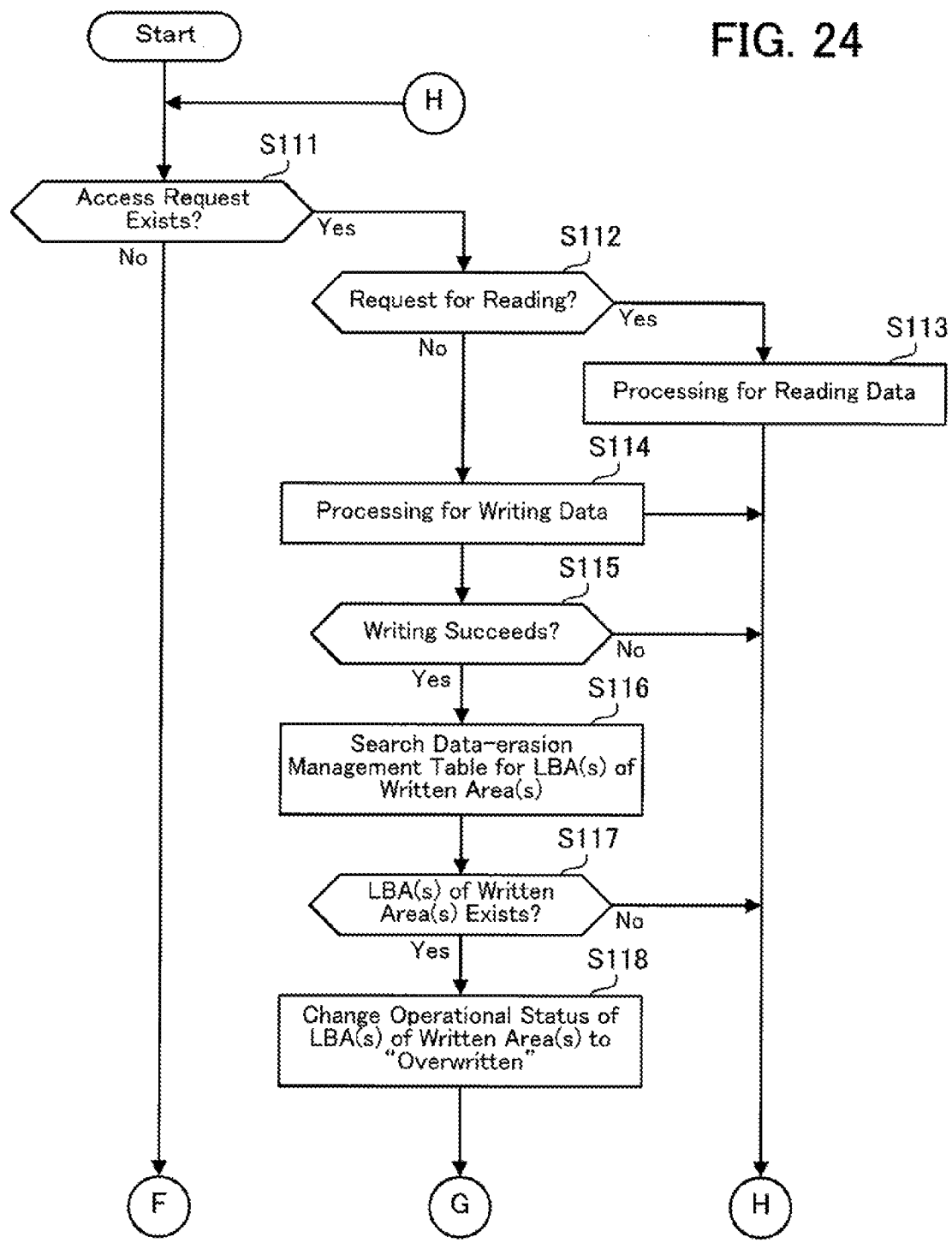
FIGS. 24 and 25 indicate an example of a flow of operations performed by a storage control unit in a sequence including host-access processing and processing for overwriting in a third data-erasion mode.
Figure 25:
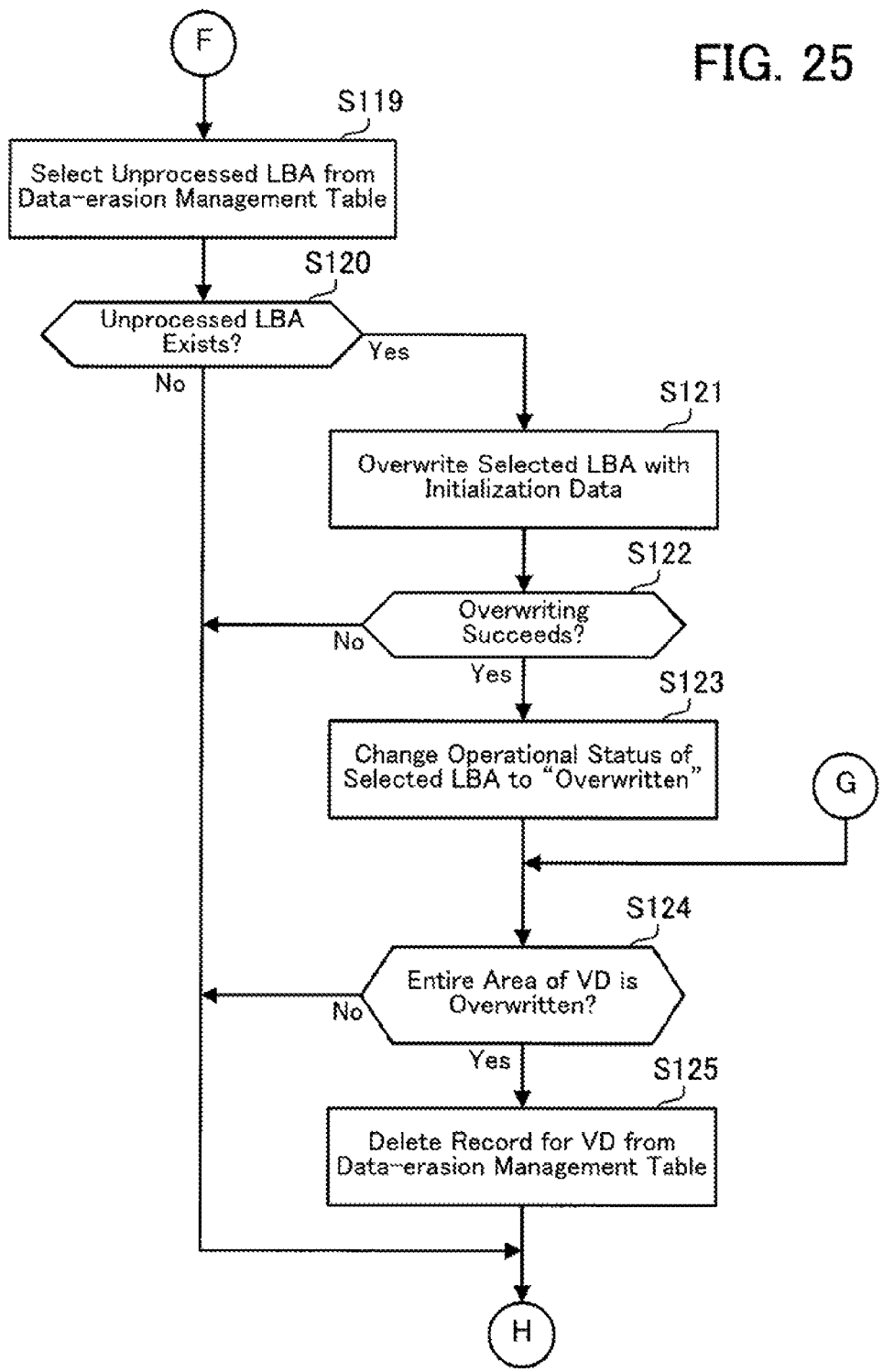

FIGS. 24 and 25 indicate an example of a flow of operations performed by the storage control unit 320 in a sequence including host-access processing and processing for overwriting in the third data-erasion mode.

<Step S111> The host I/O processing unit 321 in the storage control apparatus 302 determines whether or not the storage control apparatus 302 has one or more access requests received from the virtualization control unit 210 in the host server 200. For example, the host I/O processing unit 321 determines whether or not a queue arranged for holding unprocessed control commands contains one or more access request commands received from the virtualization control unit 210. When the queue contains one or more access request commands received from the virtualization control unit 210, i.e., when yes is determined in step S111, the operation goes to step S112. When the queue contains no access request command received from the virtualization control unit 210, i.e., when no is determined in step S111, the operation goes to step S119 (in FIG. 25).

<Step S112> The host I/O processing unit 321 determines whether one of the one or more access requests which is earliest received from the virtualization control unit 210 is a request for reading or a request for writing. When the earliest received access request is a request for reading, i.e., when yes is determined in step S112, the operation goes to step S113. When the earliest received access request is a request for writing, i.e., when no is determined in step S112, the operation goes to step S114.

<Step S113> The host I/O processing unit 321 performs an operation for reading data from a physical storage area allocated for the virtual disk in response to the earliest received access request. Thereafter, the operation goes to step S111, and the host I/O processing unit 321 determines again whether or not the storage control apparatus 302 has one or more access requests received from the virtualization control unit 210.

<Step S114> The host I/O processing unit 321 performs an operation for writing data in a physical storage area allocated for the virtual disk in response to the earliest received access request.

<Step S115> When the host I/O processing unit 321 succeeds in the writing, i.e., when yes is determined in step S115, the host I/O processing unit 321 returns to the virtualization control unit 210 a response indicating completion of the writing, and then the operation goes to step S116. When the host I/O processing unit 321 fails in the writing, i.e., when no is determined in step S115, the host I/O processing unit 321 returns to the virtualization control unit 210 a response indicating the failure in the writing, and then the operation goes back to step S111. In step S111, the host I/O processing unit 321 determines again whether or not the storage control apparatus 302 has one or more access requests received from the virtualization control unit 210.

<Step S116> The host I/O processing unit 321 searches the data-erasion management table 350 for the LBA corresponding to the storage area in which the data is written in step S114.

<Step S117> When the LBA corresponding to the storage area in which the data is written is registered in the data-erasion management table 350, i.e., when yes is determined in step S117, the operation goes to step S118. When the LBA corresponding to the storage area in which the data is written is not registered in the data-erasion management table 350, i.e., when no is determined in step S117, the operation goes back to step S111. In step S111, the host I/O processing unit 321 determines again whether or not the storage control apparatus 302 has one or more access requests received from the virtualization control unit 210.

<Step S118> The host I/O processing unit 321 changes the operational status of each of unit area having the LBA corresponding to the storage area in which the data is written, from "Unprocessed" to "Overwritten" in the data-erasion management table 350. Thus, the unit area the operational status of which is changed as above is excluded from one or more unit areas which are to be overwritten. Thereafter, the operation goes to step S124 in FIG. 25.

<Step S119> The data-erasion processing unit 322 selects from the data-erasion management table 350 one or more LBAs the operational status of which is "Unprocessed" as the one or more storage areas to be overwritten. For example, the data-erasion processing unit 322 may select consecutive multiple LBAs the operational status of which is "Unprocessed" and the number of which does not exceed a predetermined number.

<Step S120> The data-erasion processing unit 322 determines whether or not at least one LBA the operational status of which is "Unprocessed" can be selected in step S119. When at least one LBA can be selected in step S119, i.e., when yes is determined in step S120, the operation goes to step S121. When no LBA the operational status of which is "Unprocessed" cannot be selected in step S119, i.e., when no is determined in step S120, the operation goes to step S111 in FIG. 24.

<Step S121> The data-erasion processing unit 322 overwrites the physical storage areas corresponding to the one or more LBAs selected in step S119, with the initialization data.

<Step S122> The data-erasion processing unit 322 determines whether or not the overwriting with the initialization data in step S121 succeeds. When the overwriting with the initialization data in step S121 succeeds, i.e., when yes is determined in step S122, the operation goes to step S123. When the overwriting with the initialization data in step S121 fails, i.e., when no is determined in step S122, the operation goes to step S111 in FIG. 24.

<Step S123> The data-erasion processing unit 322 changes the operational status of each LBA corresponding to the physical storage area overwritten in step S121 from "Unprocessed" to "Overwritten" in the data-erasion management table 350.

<Step S124> The data-erasion processing unit 322 determines, by reference to the data-erasion management table 350, whether or not the operational status of every LBA in the record for the virtual disk containing the LBA the operational status of which is changed in step S123 is "Overwritten". When the operational status of every LBA in the above record is "Overwritten", i.e., when yes is determined in step S124, the operation goes to step S125. When the operational status of at least one LBA in the above record is "Unprocessed", i.e., when no is determined in step S124, the operation goes to step S111 in FIG. 24.

<Step S125> The data-erasion processing unit 322 deletes from the data-erasion management table 350 the record for the virtual disk containing the LBA the operational status of which is changed in step S123. Thus, the data-erasion processing in the third data-erasion mode for one virtual disk the use of which is completed is completed. Thereafter, the operation goes back to step S111 in FIG. 24.

According to the processing in FIGS. 24 and 25, the operation of overwriting with initialization data in step S121 is performed on the all storage areas corresponding to all the logical units (all the logical volumes) which have been allocated for a virtual disk the use of which is completed, other than the storage areas in which data are written in response to requests from the host server 200 in step S114. Thus, the logical volumes allocated for the virtual disk the use of which is completed can be immediately made to transition to a reusable state, because it is possible to prevent overwriting, with initialization data, of the storage area in the logical volumes in which new data is written after the logical volumes are reused (allocated) for other virtual disks.

In addition, since each storage area in the reused logical volumes in which new data is written is skipped in the operation of overwriting with the initialization data, the area which is to be overwritten with the initialization data is reduced, so that the time needed for the operation of overwriting with the initialization data is also reduced. Further, it is possible to reduce the influence of the overwriting operation on the host I/O processing.

Furthermore, even when the storage control apparatus 302 has an access request received from the virtualization control unit 210 in the host server 200, the operation of overwriting in the first data-erasion mode is performed in parallel with the access operation in response to the access request. Therefore, the operation of overwriting in the first data-erasion mode can lower the performance (speed) of the host I/O processing. On the other hand, the operation of overwriting with the initialization data in step S121 is performed only when the storage apparatus 300 has no access request received from the virtualization control unit 210 in the host server 200. Therefore, the operation of overwriting in the third data-erasion mode (in step S121) does not affect the performance of the host I/O processing.

Alternatively, at least part of the functions of the storage management unit 410 and the storage-pool management unit 420 provided in the infrastructure management server 400 may be provided in the host server 200. Further, in the case where the functions of the storage-pool management unit 420 are provided in the host server 200, the storage-pool management tables 440 and the virtual-disk management table 450 may also be held in a storage device in the host server 200.

3. Additional Matters

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions and alterations could be made hereto without departing from the spirit and scope of the invention.

What is claimed is:

1. A storage control apparatus comprising:
a physical memory configured to store encryption-key information including encryption keys respectively associated with divided areas defined by division of one or more storage areas in one or more storage devices; and
a physical processor configured to perform a procedure including,
acquiring from the encryption-key information one of the encryption keys associated with one of the divided areas in which data is to be written, encrypting the data to be written, by use of the one of the encryption keys, to generate encrypted data, and writing the encrypted data in the one of the divided areas, and
invalidating one or more of the encryption keys associated with one or more of the divided areas and included in the encryption-key information when the storage control apparatus receives, from a management apparatus, designation of the one or more of the divided areas and an instruction to invalidate data stored in the one or more of the divided areas, and the one or more of the divided areas are allocated as one or more physical storage areas for a virtual storage area to be invalidated.

2. The storage control apparatus according to claim 1, wherein the procedure further includes overwriting at least part of the one or more of the divided areas with initialization data for data erasion.

3. The storage control apparatus according to claim 2, wherein the at least part of the one or more of the divided areas are the one or more of the divided areas excluding part of the one or more of the divided areas in which new data is written after the storage control apparatus receives the instruction.

4. The storage control apparatus according to claim 2, wherein the overwriting is performed at an arbitrary time after the storage control apparatus receives the instruction.

5. The storage control apparatus according to claim 4, wherein the overwriting is performed after the storage control apparatus receives the instruction when the storage control apparatus has no request for access to the storage devices which is received from a host apparatus.

6. The storage control apparatus according to claim 2, wherein the overwriting is performed after the one or more of the encryption keys are invalidated.

7. A storage system comprising:
a management apparatus containing a first physical processor configured to perform a first procedure which includes sending to a storage control apparatus designation of one or more of divided areas and an instruction to invalidate data stored in the one or more of the divided areas, where the divided areas are defined by division of one or more storage areas in one or more storage devices, and the one or more of the divided areas are allocated as one or more physical storage areas for a virtual storage area to be invalidated; and
the storage control apparatus containing,
a physical memory configured to store encryption-key information including encryption keys respectively associated with the divided areas; and
a second physical processor configured to perform a second procedure which includes,
acquiring from the encryption-key information one of the encryption keys associated with one of the divided areas in which data is to be written, encrypting the data to be written, by use of the one of the encryption keys, to generate encrypted data, and writing the encrypted data in the one of the divided areas, and invalidating one or more of the encryption keys associated with one or more of the divided areas and included in the encryption-key information when the storage control apparatus receives, from the management apparatus, the designation of the one or more of the divided areas and the instruction to invalidate data stored in the one or more of the divided areas, and the one or more of the divided areas are allocated as one or more physical storage areas for a virtual storage area to be invalidated.

8. The storage system according to claim 7, wherein the second procedure further includes overwriting at least part of the one or more of the divided areas with initialization data for data erasion.

9. The storage system according to claim 8, wherein the at least part of the one or more of the divided areas are the one or more of the divided areas excluding part of the one or more of the divided areas in which new data is written after the storage control apparatus receives the instruction.

10. The storage system according to claim 9, wherein the second procedure further includes making the one or more of the divided areas transition to a state in which the one or more of the divided areas can be allocated for another virtual storage area, after the first physical processor sends the instruction to the storage control apparatus.

11. The storage system according to claim 8, wherein the overwriting is performed at an arbitrary time after the storage control apparatus receives the instruction.

12. The storage system according to claim 11, wherein the overwriting is performed after the storage control apparatus receives the instruction when the storage control apparatus has no request for access to the storage devices which is received from a host apparatus.

13. The storage system according to claim 8, wherein the overwriting is performed after the one or more of the encryption keys are invalidated.

14. A storage control method comprising:
performing, by a storage control apparatus, operations of referring to encryption-key information including encryption keys respectively associated with divided areas defined by division of one or more storage areas in one or more storage devices, acquiring from the encryption-key information one of the encryption keys associated with one of the divided areas in which data is to be written, encrypting the data to be written, by use of the one of the encryption keys, to generate encrypted data, and writing the encrypted data in the one of the divided areas;

sending, by a management apparatus, to the storage control apparatus, designation of one or more of the divided areas and an instruction to invalidate data stored in the one or more of the divided areas, where the one or more of the divided areas are allocated as one or more physical storage areas for a virtual storage area to be invalidated; and invalidating, by the storage control apparatus, one or more of the encryption keys associated with the one or more of the divided areas and included in the encryption-key information, in response to the instruction from the management apparatus.

15. The storage control method according to claim 14, further comprising overwriting, by the storage control apparatus, at least part of the one or more of the divided areas with initialization data for data erasion.

16. The storage control method according to claim 15, wherein the at least part of the one or more of the divided areas are the one or more of the divided areas excluding part of the one or more of the divided areas in which new data is written after the storage control apparatus receives the instruction.

17. The storage control method according to claim 16, further comprising making, by the management apparatus, the one or more of the divided areas transition to a state in which the one or more of the divided areas can be allocated for another virtual storage area, after the management apparatus sends the instruction to the storage control apparatus.

18. The storage control method according to claim 15, wherein the overwriting is performed at an arbitrary time after the storage control apparatus receives the instruction.

19. The storage control method according to claim 18, wherein the overwriting is performed after the storage control apparatus receives the instruction when the storage control apparatus has no request for access to the storage devices which is received from a host apparatus.

20. The storage control method according to claim 15, wherein the overwriting is performed after the one or more of the encryption keys are invalidated.

\* \* \* \* \*